United States Patent [19]
Lozano

[11] Patent Number: 5,574,670
[45] Date of Patent: Nov. 12, 1996

[54] APPARATUS AND METHOD FOR DETERMINING A NUMBER OF DIGITS LEADING A PARTICULAR DIGIT

[75] Inventor: Leonel Lozano, Austin, Tex.

[73] Assignee: Advanced Micro Devices, Inc., Sunnyvale, Calif.

[21] Appl. No.: 295,347

[22] Filed: Aug. 24, 1994

[51] Int. Cl.[6] .............................. G06F 7/00; G06F 15/00
[52] U.S. Cl. ................................... 364/715.1; 364/715.04
[58] Field of Search ........................... 364/715.1, 715.04, 364/715.09, 715.11, 748

[56]        References Cited
            U.S. PATENT DOCUMENTS

| | | | |
|---|---|---|---|
| 4,161,784 | 7/1979 | Cushing et al. | 364/748 |
| 4,631,696 | 12/1986 | Sakamoto | 364/748 |
| 4,789,956 | 12/1988 | Hildebrandt | 364/736.5 |
| 4,928,223 | 5/1990 | Dao et al. | 364/200 |
| 5,053,631 | 10/1991 | Perlman et al. | 364/748 |
| 5,058,048 | 10/1991 | Gupta et al. | 364/748 |
| 5,128,888 | 7/1992 | Tamura et al. | 364/748 |

FOREIGN PATENT DOCUMENTS

94/27205  11/1994  WIPO .

OTHER PUBLICATIONS

R. M. Tomasulo, *An Efficient Alforithn for Exploiting Multiple Arithmetic Units*, Part 2, Regions of Computer Space, Section 3 Concurrency: Single–Processor System (IBM Journal;, vol. 11, Jan. 1967), pp. 293–305.

R. M. Tomasulo, *An Efficient Algorithm for Exploiting Multiple Arithmetic Units*, IBM Journal of Research and Development, Jan. 1967, vol. 11, pp. 25–32.

Vojin G. Oklobdzija, *An Algorithmic and Novel Design of a Leading Zero Detector Circuit: Comparison with Logic Synthesis*, IEEE Transactions on Very Large Scale Integration (VLSI) Systems, Mar. 2, 1994, pp. 124–128.

IEEE Standard for Binary Floating–Point Arithmetic, ANSI/IEEE Std. 754–1985 ©1985, pp. 7–17.

*Primary Examiner*—Roy N. Envall, Jr.
*Assistant Examiner*—Emmanuel L. Moise
*Attorney, Agent, or Firm*—Skjerven, Morrill, MacPherson, Franklin & Friel; Kent B. Chambers

[57]            ABSTRACT

When a data input signal having R plus X groups of M digits is received, the digits are segmented such that X different first counter-detectors receive M digits and a second counter-detector receives the R digits. The counter-detectors determine a number of most significant count digits leading a most significant non-count digit and detect the presence of a non-count digit. A decoder receives the outputs of the first counter-detectors and, responsive to a non-count digit detection in a most significant group of M digits having a non-count digit, communicates the corresponding count number to a concatenator. A third counter-detector determines and communicates a number of most significant groups of M digits having no non-count digits. An output of the third counter detector is concatenated with an output of the decoder where the decoder output is represented by Z digits where $M=N^Z$ (X, M, R, N, and Z are non-negative integers). The concatenation represents the number of leading count digits. If R is non-zero, the second counter-detector determines a number of most significant count digits leading a most significant non-count digit and detects the presence of a non-count digit in the R most significant bits. An adder then adds R to the concatenation. A multiplexer selects the number of leading count digits in the R bits if the R bits contain a non-count digit else the multiplexer selects the concatenation plus R.

35 Claims, 13 Drawing Sheets

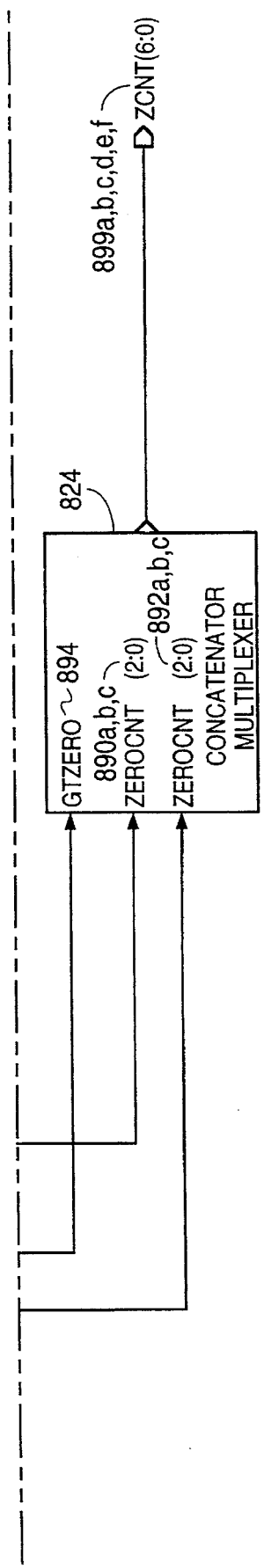

APPARATUS AND METHOD FOR DETERMINING A NUMBER OF DIGITS LEADING A PARTICULAR DIGIT

BACKGROUND OF THE INVENTION

1. Field of the Invention

This invention relates to an apparatus and method for determining a number of digits leading a particular digit in a data input signal.

2. Description of the Related Art

An apparatus and method for determining a number of bits leading a particular bit ("leading bit indicator" when considering a binary digit apparatus) pertains to a device used to determine a number of particular count bits in a binary data signal that lead or precede a non-count bit. Each binary digit ("bit") has a value, either a one or a zero. If it is desirable to count leading bits having a value of zero, for example, then a count bit would have a value of zero and a non-count bit would have a value of one. A leading bit indicator, or leading zero indicator for the previous example, would provide an indication of the number of count bits, in a data signal containing multiple bits, that precede a non-count bit. Those count bits that lead a non-count bit in a data signal are the most significant bits. For example, each bit in a binary data signal has ones usually represented by positive voltage levels (e.g. +5 V) and/or zeros usually represented by a common ground voltage level (i.e. 0 V). Assuming a binary data signal contains 16 bits, a 16 bit binary Leading Zero Indicator would count the number of leading zeros (where zeros constitute a count bit) by determining the number of zeros that lead or precede the first one (where ones constitute a non-count bit) in the 16 bit data input signal. (Note: in the absence of a one, the number of leading zeros would equal the number of bits in the data input signal). In a numerical example, if a 16 bit binary Leading Zero Counter had a 16 bit binary data input signal such as 0000 0000 0011 0111$_2$, the Leading Zero Indicator would contain a 1010$_2$ output which represents the number of leading zeros.

Leading bit indicators are particularly useful when incorporated in floating point units. Floating point units perform floating point computations which play an important role in the realm of microprocessors. Leading zero bit counters have been particularly useful in assisting floating point units to meet ANSI/IEEE Std. 754–1985 ("IEEE Std.") for binary floating point arithmetic.

A floating point number consists of a significand, also known as a fraction or mantissa, and an exponent, which is usually (but not always) a power of 2. The exponent and significand may both vary in length depending on the range and precision desired. Signed numbers can be stored in either sign and magnitude form or by using a complement notation. (A floating point unit number may also consist of other specialty bits positioned before and/or after and/or between the significand and the exponent).

The IEEE Std. mandates representing the value of a floating point number in a normalized form i.e. as $(-1)^{sign}2^{exponent+bias}$(significand) where the bias is chosen so that exponent + bias will be a positive value. (Note: the IEEE Std. provides for a denormalized number which is a non-zero number containing leading zeros and whose exponent plus bias has a reserved value usually equal to zero). Therefore, to comply with IEEE Std. the significand and the exponent must be adjusted accordingly in order to eliminate leading zeros. Assuming that the floating point unit is designed to process binary numbers, after performing an arithmetic operation on two binary numbers the result often contains leading zeros. Unless the exponent has a minimum value, a result containing leading zeros fails to comply with the IEEE Std.

For example, if a 32 bit number has a 23 bit significand consisting of bits 0.00000001000011010101110$_2$, an exponent consisting of 01001011$_2$, and a sign bit of 0$_2$, the significand would be in an unacceptable format because the exponent is greater than the minimum exponent and zeros lead the first one in the significand. In order to put the significand into an acceptable or normalized format, the number of leading zeros should be counted and subtracted from the exponent. The significand should also be shifted to the left a number of times equal to the number of leading zeros which will place the first 1 bit in the most significant bit place. After following this procedure, a number meeting the IEEE Std. is obtained. Using the above 32 bit number, the number of leading zeros equals 0111$_2$ Therefore, the significand is shifted to the left 0111$_2$ times, and 0111$_2$ is subtracted from the exponent. The example significand and exponent would now look like 1.00001101010111000000000 and 01000100$_2$ which meets the IEEE Std.

The model 29050 Microprocessor, available from Advanced Micro Devices of Sunnyvale, Calif., contains a 56 bit leading bit indicator. FIG. 1 illustrates a high level block diagram of the leading one bit indicator found in the AMD 29050. (Note: a leading one indicator may easily be converted to determine a number of leading zeros by inverting each of the data input signal bits prior to its reception by the leading one indicator). Referring to FIG. 1, the AMD 29050 56 bit counter receives a 56 bit number with the last bit, bit 0, being the least significant bit and the first bit, bit 55, being the most significant bit. The 8 bit counter logic 112 receives the most significant group of bits 48–55, 8 bit counter logic 110 receives the second most significant group of bits 40–47, 8 bit counter logic 108 receives the third most significant group of bits 40–47, 8 bit counter logic 108 receives the fourth most significant group of bits 32–39, 8 bit counter logic 106 receives the fifth most significant group of bits 24–21, 8 bit counter logic 104 receives the sixth most significant group of bits 16–23, 8 bit counter logic 102 receives the seventh most significant group of bits 8–15, and 8 bit counter logic 100 receives least significant group of bits 0–7. Each 8 bit counter logic provides two outputs. The first output is a 3 bit output representing the number of leading ones in the 8 bit data input signal of the 8 bit counter logic. The second output of the 8 bit counter logic is a 2 bit signal representing the presence of a zero in the least significant 4 bits and the presence of a zero in the most significant 4 bits.

The 56 bit counter logic 122 receives the output of 8 bit counter logic 100. The 16 bit counter logic 114 receives the outputs of 8 bit counter logic 102 and 104. The 56 bit counter logic 122 receives two outputs from 16 bit counter logic 114. The first output of 16 bit counter logic 114 is a 4 bit number representing the number of leading ones in the data input signal to 16 bit counter logic 114. The second output is a 2 bit number that represents the presence or the absence of a zero in bits 8–23. Sixteen bit counter logic 114 first determines the presence of a zero in the most significant 8 bits 16–23. If a zero is present, the circuit determines only the number of zeros in the most significant 8 bits. If the most significant 8 bits contained all ones, the output would correspond to the 8 ones in the most significant 8 bits plus the number of ones in the least significant 8 bits. The output is then received by the 56 bit counter logic 122.

Sixteen bit counter logic 116 functions similarly to 16 bit counter logic 114 except that 16 bit counter logic 116 operates on bits 24–39 and 16 bit counter logic 118 operates on bits 48–55. Sixteen bit counter logic 116 and 16 bit counter logic 118 have outputs that are received by 32 bit counter logic 120. Thirty-two bit counter logic 120 determines the number of ones in the two 16 bit counter logics 116 and 118. If the most significant 16 bits, bits 40–55, contain a zero, the output of 32 bit counter logic will represent the number of ones present in bits 40–55. If bits 40–55 contain all ones, the output of 32 bit counter logic 120 will reflect the number of ones present in bits 24–55. Thirty-two bit counter logic 120 has a second output indicating whether or not a zero is present in bits 40–55 and whether or not a zero is present in bits 24–39.

Fifty-six bit counter logic 122 contains the final output which represents the number of leading ones in the original 56 bit data input signal. Fifty-six bit counter logic 122 operates by detecting the presence of a zero in the most significant 32 bits. If a zero is detected, the number of ones received from 32 bit counter logic 120 are provided to an output. This result represents the correct number of leading ones in the original 56 bit data input signal. If the most significant 32 bits contain all ones, 56 bit counter logic 122 then analyzes the next 16 bits, bits 8–23, and detects the presence of a zero. If a zero is present, the output of 56 bit counter logic 122 represents the most significant 32 bits containing ones exclusively and the number of leading ones in the next 16 bits, bits 8–23. The 56 bit counter logic 122 subsequently analyzes the 8 bit counter logic 100 output only if the most significant 48 bits contained all ones. If the most significant 48 bits contained all ones, the output of 56 bit counter logic 122 would reflect the number of leading ones in the most significant 48 bits containing ones exclusively and the number of leading ones in the least significant 8 bits. Fifty-six bit counter logic 122 has a second output that represents the presence of a zero anywhere in the original 56 bit data input signal.

A disadvantage of the discussed prior art is the complex implementation of multiple stages necessary to determine the number of leading count bits present in a data input signal. Further, complex implementation results in a slower device speed due to propagation delays from a larger number of logic stages.

SUMMARY OF THE INVENTION

These disadvantages and others are overcome in the present invention. Additionally, the present invention offers several advantages. One advantage is that the present invention is simpler to construct. The present invention also advantageously operates at higher operating speeds. The present invention in a first embodiment is a leading digit indicator for determining a number of leading count values in a data input signal. A leading digit indicator pertains to a device used to determine a number of particular count digits in a data signal that lead or precede a non-count digit. A count digit is a digit whose value it is desirable to count. A non-count digit is a digit whose value it is not desirable to count. Leading count digits are the most significant digits in a data input signal, having any number of digits, that precede (or are more significant than) the most significant non-count digit. The data input signal has X groups of M digits with each digit having N possible values. The N possible values may be count values and non-count values. The leading digit indicator includes a first input to receive a first data input signal. The first data input signal is indicative of a number of most significant groups of M digits leading a most significant non-count group. The first data input signal may be provided by a counter or counter-detector. The most significant non-count group is a most significant group of M bits to have a non-count digit, where a non-count digit is a digit with a non-count value. The leading digit indicator further includes a second input to receive a second data input signal. The second data input signal is indicative of a number of leading count digits in the first non-count group, where a count digit is a digit with a count value. The second data input signal may be provided by a counter or counter-detector. The count and non-count values may include a two values such as a zero and a one in a binary data signal or may include groups of values in a data input signal possessing a multiplicity of values. The leading digit indicator further includes a concatenator, coupled to the first and second inputs, to concatenate the first data input signal and the second data input signal to form a concatenation representing the number of leading count digits in the X groups of M digits in the data input signal. The second data input signal is represented by Z bits where $M=N^Z$ and X, M, N, and Z are non-negative integers.

In a second embodiment, the present invention is a leading digit indicator where the data input signal includes R most significant digits in addition to the X groups of M bits in the previous embodiment. The second embodiment includes the first embodiment and additionally includes a third input to receive a third data input signal, adder circuitry, and multiplexer circuitry. The third data input signal indicates the presence and location of a non-count digit in the R most significant digits. The third data input signal may be provided by a counter or counter-detector. The adder is coupled to the concatenator circuitry and adds R to the concatenation of the first embodiment to form a concatenation plus R. The adder circuitry further has an output to communicate the concatenation plus R. The multiplexer circuitry, coupled to the adder output to receive the concatenation plus R and the third data input signal, includes an output to communicate the concatenation plus R when the third input data signal indicates the absence of a non-count digit in the R most significant digits and to communicate the number of leading count digits in the R most significant digits when the third input signal indicates the presence and location of a non-count digit in the R most significant digits, wherein a non-count digit is a digit having a non-count value.

It will also be appreciated that methods for determining a number of leading count digits in a data input signal are also disclosed.

DESCRIPTION OF THE PREFERRED EMBODIMENTS

Figure 10:
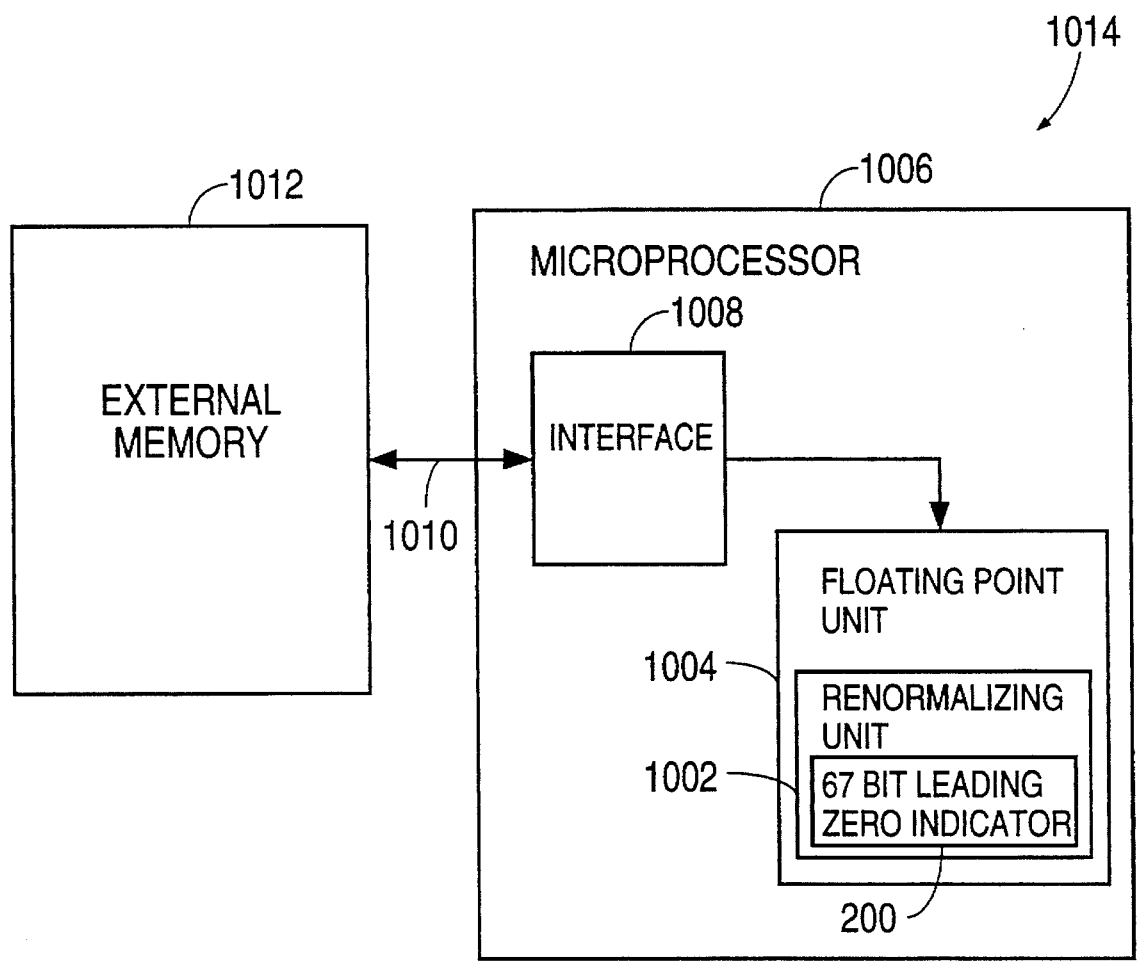
FIG. 10 illustrates a block diagram of a computer system.

Referring to FIG. 10, the 67 bit Leading Zero Indicator 200 may be used, for example, in a Renormalizing unit 1002 within a floating point unit 1004 which is part of a computer system 1014. Typically, a Renormalizing unit is part of a floating point unit. Various floating point units are well known in the art, and include the Floating Point Unit in U.S. Pat. No. 5,058,048, the disclosure of which is hereby incorporated by reference. Furthermore, the Floating Point Unit 1004 may be used, for example, separately from or, as shown, integrated with a Microprocessor 1006. One suitable integration of a floating point unit with a superscalar microprocessor is disclosed in the "High Performance Superscalar Microprocessor," U.S. application Ser. No. 08/146,382 (attorney's docket number M-2518 US) by D. B. Witt and W. Johnson, filed on Oct. 29, 1993, the disclosure of which is hereby incorporated by reference. The interface 1008 of microprocessor 1006 is connected via bus 1010 to external memory 1012. The computer system 1014 typically includes such other components as a keyboard and display (not shown).

ENUMERATOR CIRCUIT 227—STRUCTURE

Figure 1:
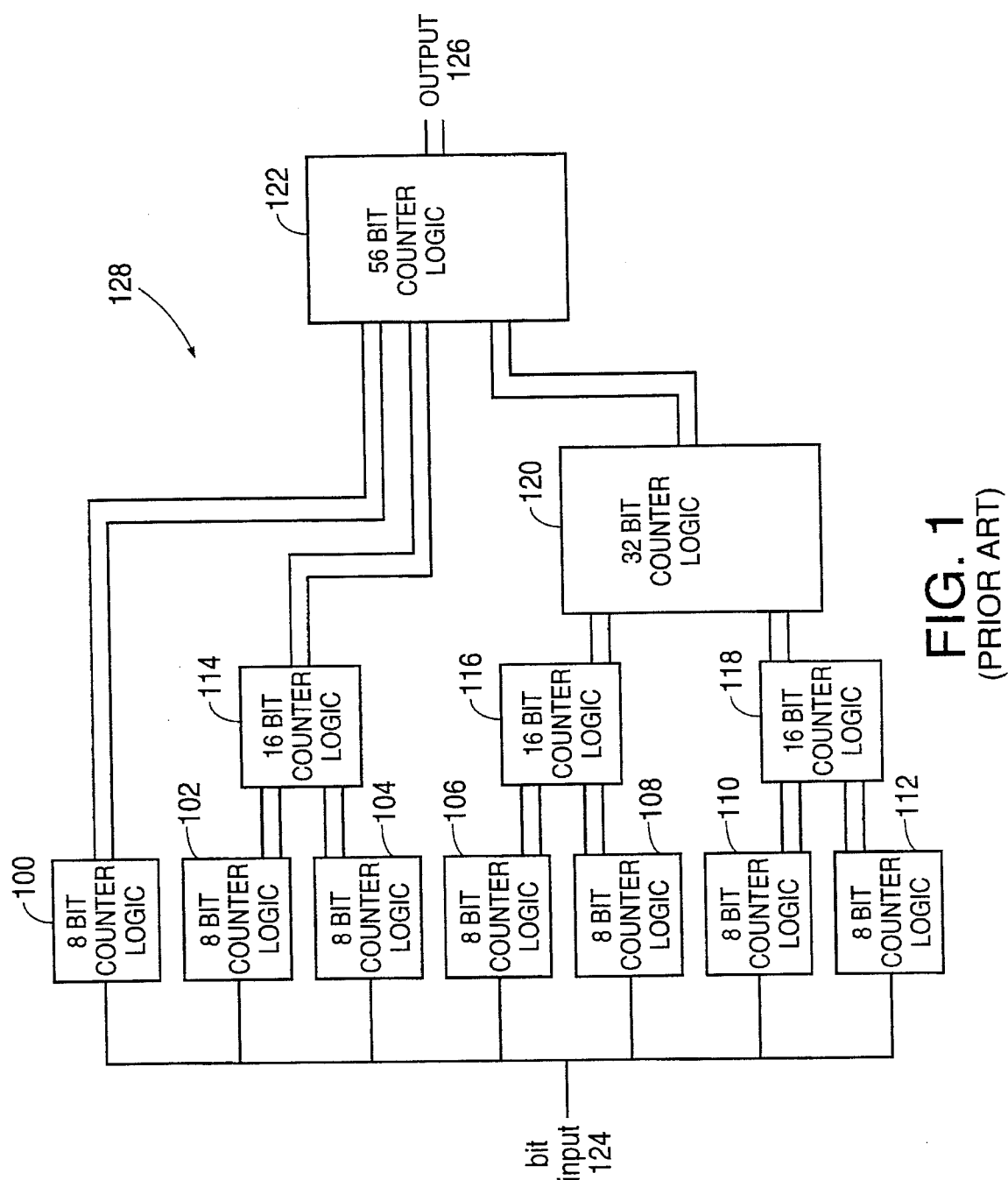
FIG. 1 illustrates a block diagram of the prior art Advanced Micro Devices 29050 Leading One Indicator.
Figure 2A:
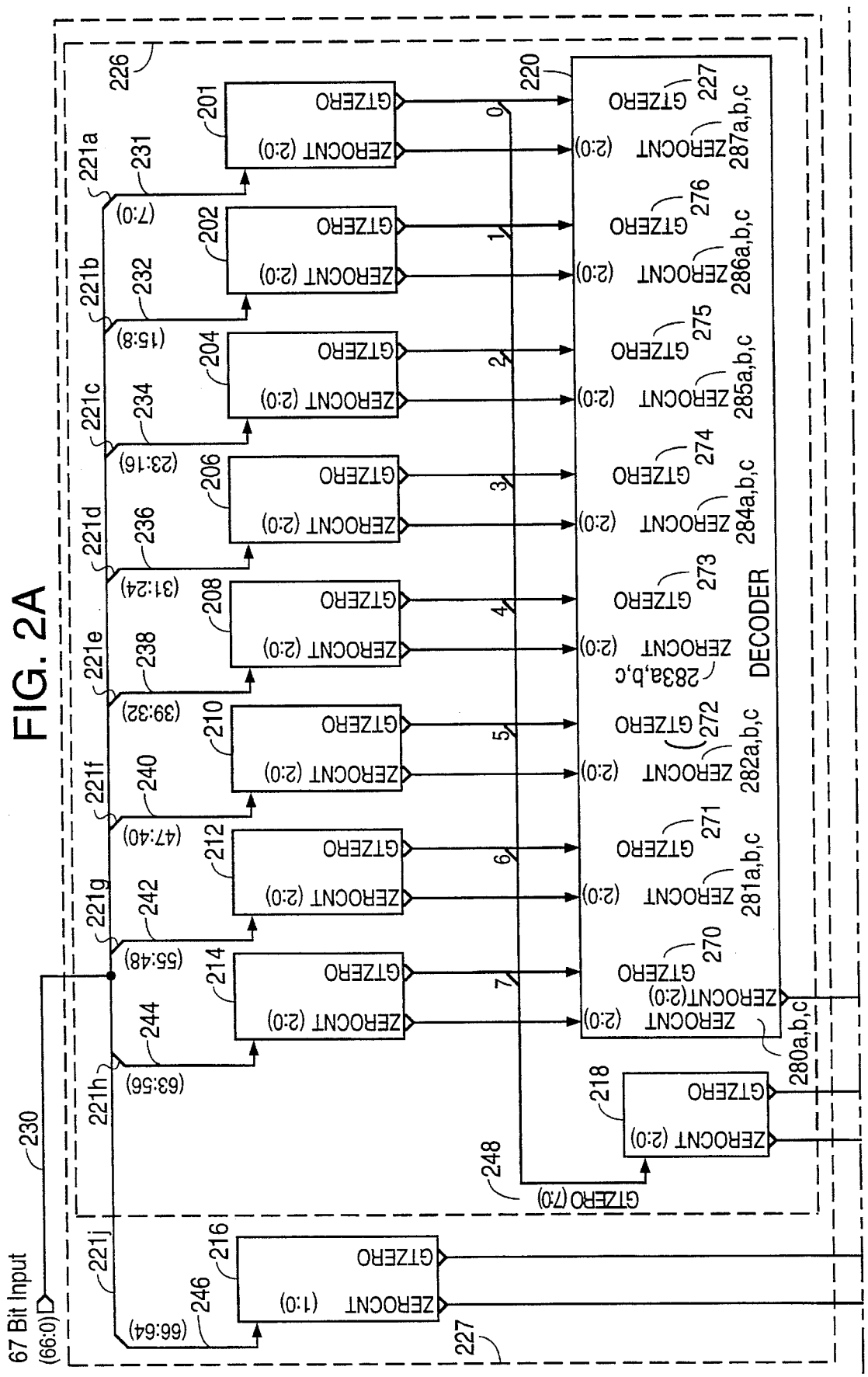
FIG. 2 illustrates a block diagram of a 67 bit Leading Zero Indicator.
Figure 2B:
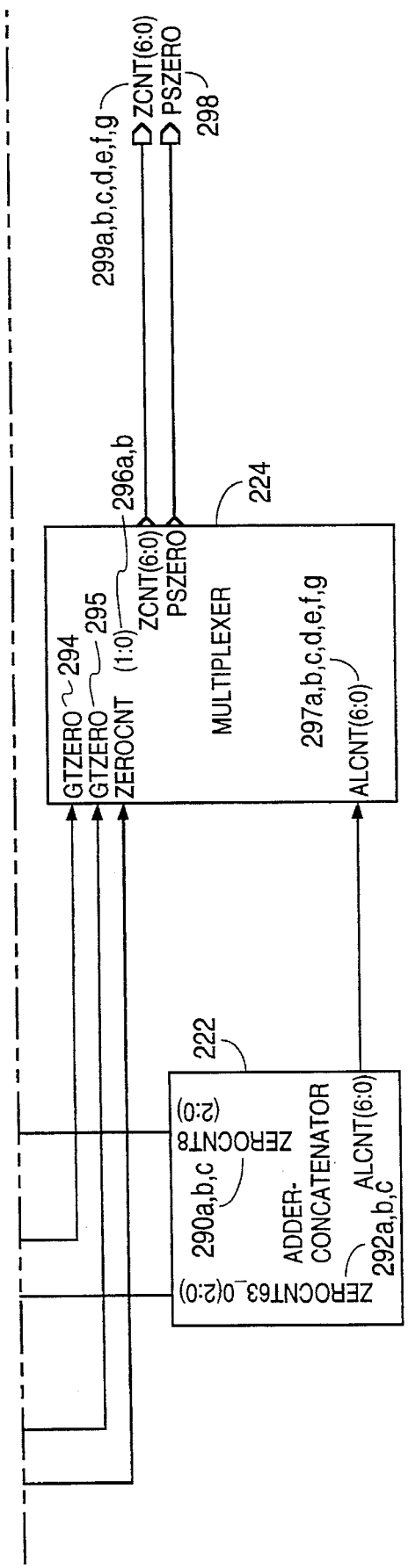

FIG. 2 illustrates a block diagram of a 67 bit Leading Zero Indicator. The 67 bit Leading Zero Indicator 200 incorporates enumerator circuit 227, ADDER-CONCATENATOR 222 and MULTIPLEXER 224. Enumerator circuit 227 includes counter circuit 226 and 4 bit COUNTER-DETECTOR 216. Counter circuit 226 contains nine 8 bit COUNTER-DETECTORS 201–214 and 218 and DECODER 220. The 67 bit Leading Zero Indicator receives a binary data input signal obtained from floating point data stored in the external memory 1012 of FIG. 10. Each bit of the binary data input signal possesses one of two values. Enumerator circuit 227 has individual inputs for receiving each bit of a binary data input signal in parallel, although it will be appreciated that the circuit could easily be modified to receive each bit serially. The two values may be denoted as zeros and ones with a zero representing a reference voltage level, e.g. 0 Volts, and a one representing a different voltage level, e.g. +5 Volts (although other voltage levels such as +3 Volts may be used). A binary leading zero indicator determines the number of leading zeros, i.e. the number of zeros in the most significant positions of the data input signal that precede a one, and if a one is not present in the data input signal, the number of zeros in the data input signal. In a leading zero indicator, a zero symbolizes a "count bit" and a one symbolizes a "non-count bit." Where a "count bit" denotes a value that is to be counted by a leading bit indicator, and a "non-count bit" denotes a value that is not to be counted by a leading bit indicator.

ENUMERATOR CIRCUIT 227—OPERATION

In operation, enumerator circuit 227 receives a 67 bit data input signal 230 in parallel and segments the 67 bit data input signal 230, by routing data signal input lines 221a–221j to the counter detectors 201–216, respectively, into a most significant group of 3 bits and 8 groups of 8 bits. Data signal input lines 221a–221h each consist of 8 separate conductors, and data signal line 221j consists of 3 separate conductors. The 4-bit COUNTER-DETECTOR 216 and counter circuit 226 receive portions of the segmented 67 bit data input signal 230. The 4 bit COUNTER-DETECTOR 216 receives the most significant group of bits (66:64) 246, 8 bit COUNTER-DETECTOR 214 receives the second most significant group of bits (63:56) 244, 8 bit COUNTER-DETECTOR 212 receives the third most significant group of bits (55:48) 242, 8 bit COUNTER-DETECTOR 210 receives the fourth most significant group of bits (47:40) 240, 8 bit COUNTER-DETECTOR 208 receives the fifth most significant group of bits (39:32) 238, 8 bit COUNTER-DETECTOR 206 receives the sixth most significant group of bits (31:24) 236, 8 bit COUNTER-DETECTOR 204 receives the seventh most significant group of bits (23:16) 234, 8 bit COUNTER-DETECTOR 201 receives the eighth most significant group of bits (15:8) 232, 8 bit COUNTER-DETECTOR 201 receives the least significant group of bits (7:0) 231. (The notation "(X:Y)" represents bits X through Y with X being the most significant bit of bits X through Y e.g. (15:8) indicates an 8 bit number containing bits 15 through 8 with bit 15 being the most significant bit of bits 15 through 8.)

The 67 bit data input signal 230 was purposefully segmented into the most significant group of 3 bits and a least significant group of 64 bits. The least significant group of 64 bits was further segmented into 8 groups of 8 bits. Each 8 bit group is received by an 8 bit COUNTER-DETECTOR 201–214 which provides a 3 bit counter output signal and a one bit detector output signal which, when taken as a whole, indicate the number of leading zeros in the 8 bit data input signal. The number of data input signal bits to each COUNTER-DETECTOR is directly related to the number of possible values in the data input signal and the number of 8 bit COUNTER-DETECTOR counter output signal bits. The relationship can be stated mathematically as the number of data input signal bits received by each COUNTER-DETECTOR equals the number of possible values for each bit raised to a power equal to the number of counter output signal bits. Stated another way, the logarithm of the number of data input signal bits equals the logarithm of the number of values multiplied by the number of counter output signal bits required. With an 8 bit data input signal received by each COUNTER-DETECTOR and two possible bit values, zero and one, the number of data output signal bits in an 8 bit COUNTER-DETECTOR used to indicate the number of leading count bits in each respective 8 bit COUNTER-DETECTOR is (log 8)/(log 2)=3 or 8=$2^3$ e.g. a 16 bit data input signal has four counter data outputs in a 16 bit COUNTER-DETECTOR (i.e. (log 16)/(log 2)=4) and a 9 digit data input signal with each digit possessing three possible values, e.g. zero, one, or two, has two counter data outputs in a 9 bit COUNTER-DETECTOR (i.e. (log 9)/(log 3)=2). Note that "digit" is used to represent a single place in a data input signal with each digit capable of having any of a desired number of values such as zero, one, two, three, four, and so forth, with zeros and ones being used in a binary digit system.

8 BIT COUNTER-DETECTOR 300—STRUCTURE

Figure 3:
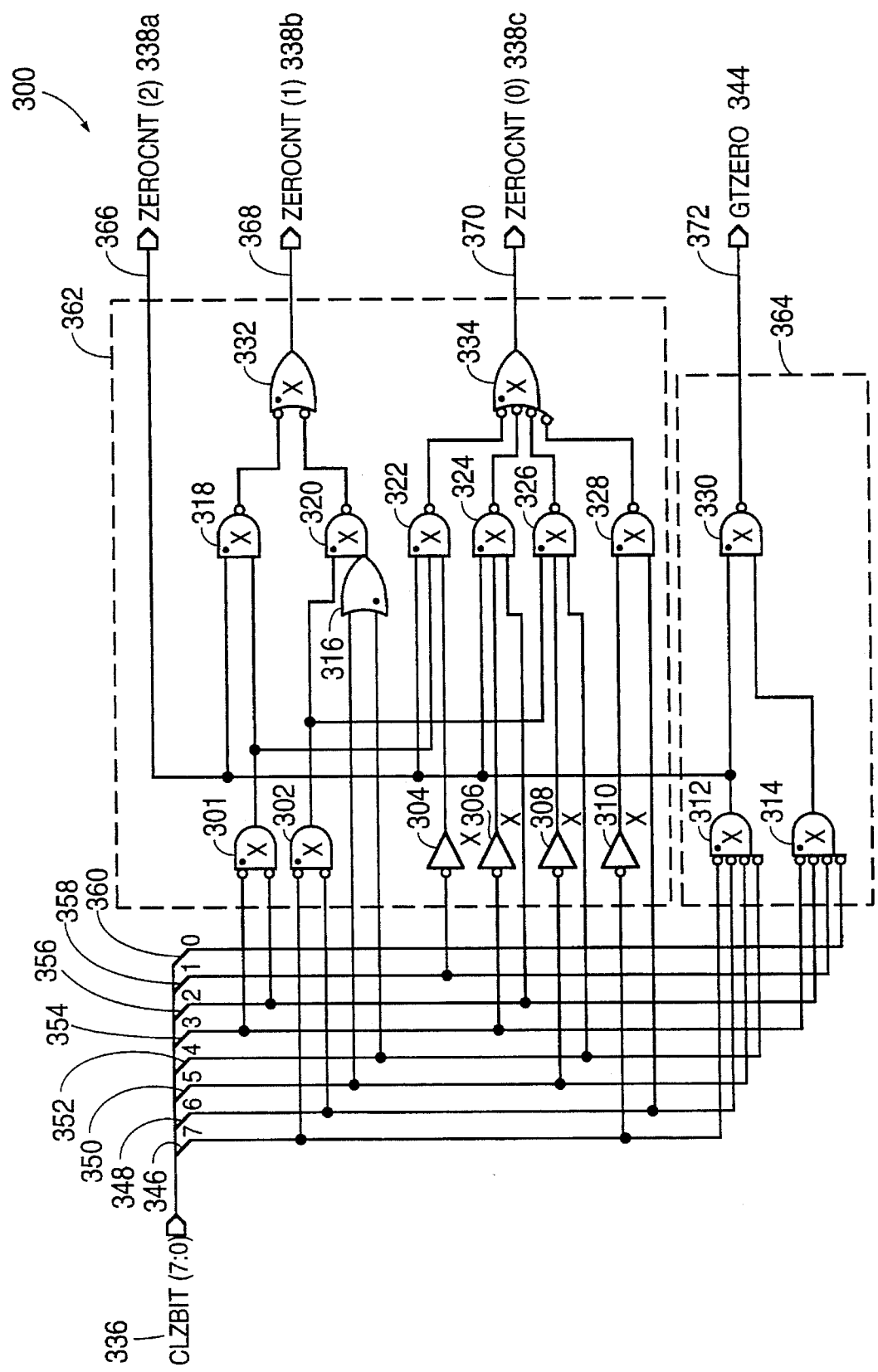
FIG. 3 illustrates a schematic diagram of an 8 bit COUNTER-DETECTOR employed by the 67 bit Leading Zero Indicator.

FIG. 3 illustrates the schematic of 8 bit COUNTER-DETECTOR 300 which schematically represents all of the 8 bit COUNTER-DETECTORS 201–214 and 218. The circuits illustrated in FIG. 3 as well as those in FIGS. 2 and FIGS. 4–9 are fabricated in complementary metal oxide semiconductor. One suitable implementation of 8 bit COUNTER-DETECTOR 300 uses an input with data signal input lines 346–360, counter circuitry 362, and detector circuitry 364. Note that 8 bit COUNTER-DETECTOR 300 may be considered as a separate counter 362 combined with a separate detector 364. The counter circuitry 362 uses NOR gates 301 and 302, INVERTERS 304–310, OR gate 316, NAND gates 318–328, outputs 366–370, and NAND gates 332–334 connected as shown in FIG. 3 to provide a 3 bit counter output signal, ZEROCNT (2) 338a, ZEROCNT (1) 338b, and ZEROCNT (0) 338c, which indicates the number of leading zeros in the 8 bit data input signal 336. The detector circuitry 364 uses NOR gates 312 and 314, output 372, and NAND gate 330 connected as shown in FIG. 3 to detect the presence of a one in the 8 bit data input signal 336 and provide a single bit output GTZERO 344 indicating the presence and absence of a detected one.

8 BIT COUNTER-DETECTOR 300—OPERATION

In operation, an 8 bit COUNTER-DETECTOR 300 determines the number of leading zeros in its respective 8 bit data input signal. Eight bit COUNTER-DETECTOR 300 receives an 8 bit data input signal 336 with each bit received and conducted sequentially on an input with data signal input lines 346–360 with input line 346 receiving the most significant bit. (Note: "sequentially" in the description of the preferred embodiments connotes location and does not connote a reference to time). Input lines 346–360 may collectively represent each of the data signal input lines 221a–221h. The 8 bit COUNTER-DETECTOR 300 has a 3 bit counter output signal, ZEROCNT (2) 338a, ZEROCNT (1) 338b, and ZEROCNT (0) 338c, representing the number of leading zeros in its 8 bit data input signal 336 when at least one of the data signal inputs 346–360 conducts a one. By ascertaining the number of leading zeros, the location of the most significant one is determined. The 3 bit counter output signal is conducted by an output with output signal lines 366–370. ZEROCNT (2) 338a represents the most significant bit, ZEROCNT (1) 338b represents the next most significant bit and ZEROCNT (0) 338c represents the least significant bit of the 3 bit output of 8 bit COUNTER-DETECTOR 300. The 8 bit COUNTER-DETECTOR 300 also contains a single bit detector output signal, GTZERO 344, which represents the presence of a one in the 8 bit data input signal when a one is present and the absence of a one in the 8 bit data input signal when a one is absent. The single bit detector output signal is conducted by output 372. If GTZERO 344 equals one (first state), one of the 8 bits received by the 8 bit COUNTER-DETECTOR 300 equals one. If GTZERO 344 equals zero (second state), all 8 bits of the data input signal are zeros. The 3 bit counter output signal and the one bit detector output signal indicate the number of zeros in the 8 bit data input signal.

DECODER 220—STRUCTURE

Figure 4A:
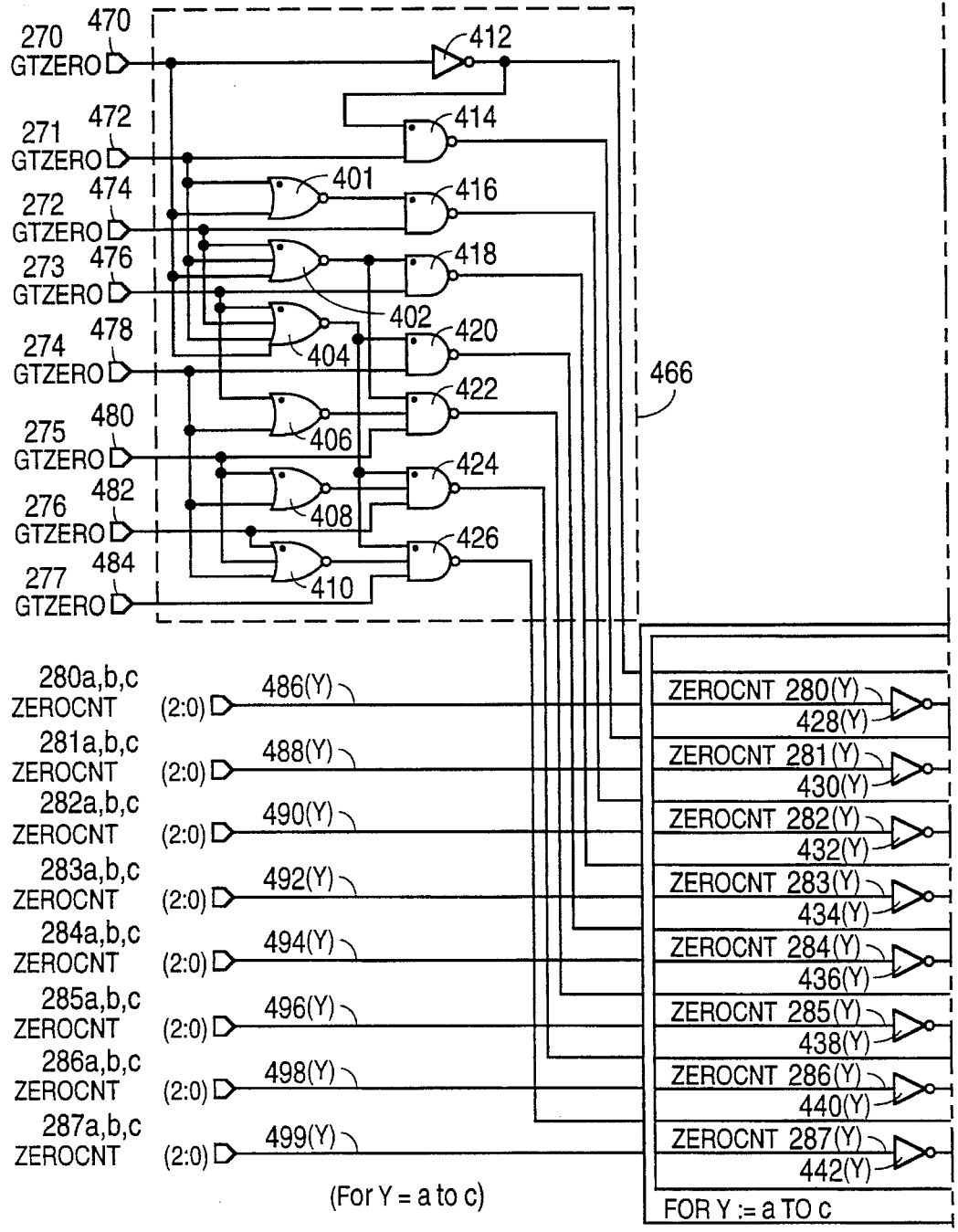
FIG. 4 illustrates a schematic diagram of a DECODER employed by the 67 bit Leading Zero Indicator.
Figure 4B:
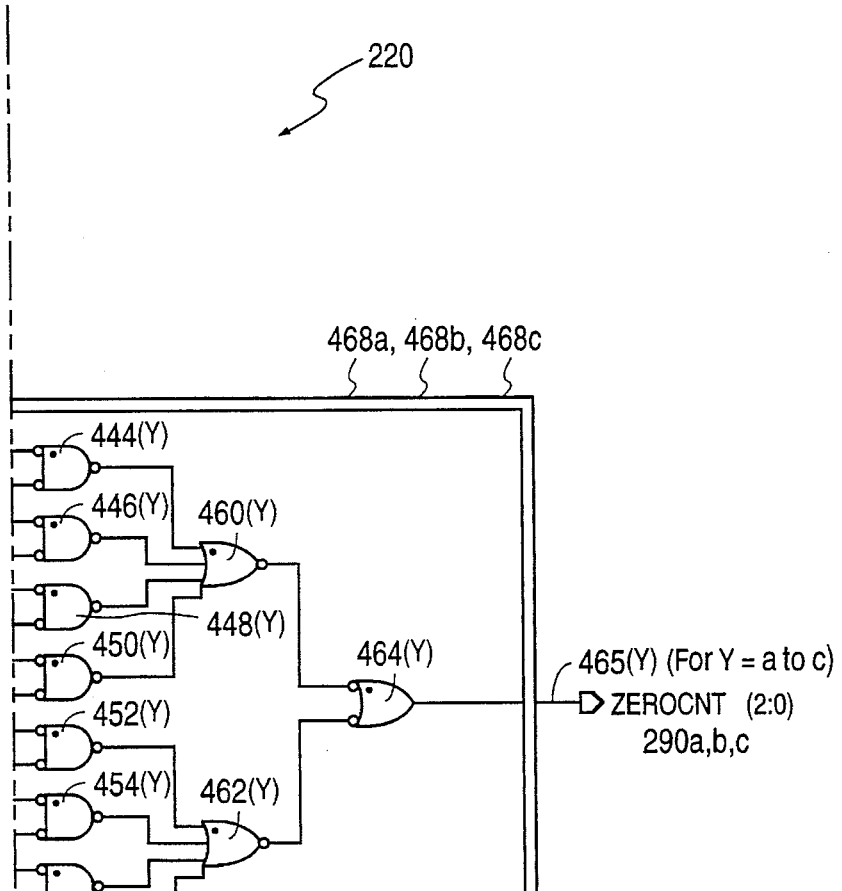
Figure 4B:
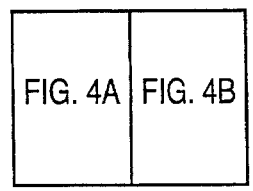

FIG. 4 illustrates a schematic diagram of DECODER 220. The DECODER 220 is connected to COUNTER-DETECTORS 201–214. One suitable implementation of DECODER 220 connects NOR gates 401–410, INVERTER 412, and NAND gates 414–426 to form circuit 466 as shown in FIG. 4. Circuit 466 is connected to an input with data signal input lines 470–484. DECODER 220 is further implemented by connecting identical circuits 468a, 468b, and 468c to circuit 466 and data inputs 486(Y)–499(Y).

In FIG. 4, circuits 468a, 468b, and 468c are represented schematically by a single circuit implemented by connecting INVERTERS 428(Y)–442(Y), NOR gates 444(Y)–458(Y), NOR gates 460(Y) and 462(Y), and NAND gate 464(Y) as shown in FIG. 4. Note the legend "FOR Y=a to c" in the boxes surrounding circuits 468a, 468b, and 468c. The legend denotes that when "Y" is substituted with "a", circuit 468a is obtained, when "Y" is substituted with "b", circuit 468b is obtained, and when "Y" is substituted with "c", circuit 468c is obtained (note: the "(2:0)" has been omitted from the ZEROCNT 280(Y)–287(Y) symbology within the boxes surrounding circuits 468a, 468b, and 468c).

DECODER 220—OPERATION

In operation, circuit 466 receives input signals GTZERO 270–277 conducted by data signal input lines 470–484. (Note: For clarity, elements present in multiple figures retain the same identifying numerals throughout all figures). Circuit 466 provides an 8 bit output with a single bit being a zero corresponding to the GTZERO output signal of the most significant of the 8 bit COUNTER-DETECTORS 201–214 to contain a one in its respective 8 bit data signal input with the other seven output bits of circuit 466 being ones. The most significant of the 8 bit COUNTER-DETECTORS 201–214 to contain a one in its respective 8 bit data input signal may be referred to as a "non-count group" due to the presence of a non-count value in its respective 8 bit data input signal.

In operation circuits 468a, 468b, and 468c receive data signals from circuit 466 and data input signals ZEROCNT (2:0) 280a,b,c–287a,b,c. Data input signals ZEROCNT (2:0) 280a,b,c–87a,b,c are conducted by inputs 486(Y)–499(Y). Circuit 468a receives ZEROCNT (2) 280a–287a, the most significant bits of ZEROCNT (2:0) 280a,b,c–287a,b,c, respectively. (The symbology "ZEROCNT (2:0) 280a,b,c" conveniently and concisely symbolizes ZEROCNT (2) 280a, ZEROCNT (1) 280b, and ZEROCNT (0) 280c. ZEROCNT (2) 280a symbolizes bit 2, the most significant bit of ZEROCNT (2:0) 280a,b,c. ZEROCNT (1) 280b symbolizes bit 1, the next most significant bit of ZEROCNT (2:0) 280a,b,c. ZEROCNT (0) 280a symbolizes bit 0, the least significant bit of ZEROCNT (2:0) 280a,b,c). Circuit 468b receives ZEROCNT (1) 280b–287b, the next most significant bits of ZEROCNT (2:0) 280a,b,c–287a,b,c, respectively. Circuit 468c receives ZEROCNT (0) 280a,b,c–287a,b,c, the least significant bits of ZEROCNT (2:0) 280a,b,c–287a,b,c, respectively. Circuits 468a, 468b, and 468c each receive identical data from circuit 466. Circuits 468a, 468b, and 468c provide the 3 bit data output signal ZEROCNT (2:0) 290a,b,c, respectively. Circuits 468a, 468b, and 468c receive the outputs of circuit 466 and ZEROCNT (2) 280a–287a, ZEROCNT (1) 280b–287b, and ZEROCNT (0) 280c–287c, respectively, from 8 bit COUNTER-DETECTORs 201–214 as inputs. The bit of circuit 466 equaling zero enables circuits 468a, 468b, and 468c to communicate the ZEROCNT (2:0), corresponding to the NAND gate connected to the single zero output of circuit 466, to the output data signal lines 465(Y) which conducts data signal output ZEROCNT (2:0) 290a,b,c. If GTZERO 270–277 all equal zero corresponding to 67 bit data input signal containing all zeros, i.e. 67 leading zeros, then ZEROCNT (2:0) 290a,b,c, is $000_2$.

8 BIT COUNTER-DETECTOR 218—OPERATION

In operation, the second outputs, GTZERO 270–277, of the 8 bit COUNTER-DETECTORS 201–214 are additionally connected to 8 bit COUNTER-DETECTOR 218 and provide an 8 bit data input signal to 8 bit COUNTER-DETECTOR 218. The schematic diagram FIG. 3 which illustrates 8 bit COUNTER-DETECTORS 201–214 also illustrates 8 bit COUNTER-DETECTOR 218. Three bit counter output signal ZEROCNT (2:0) 292a,b,c represents the number of leading zeros in the 8 bit data input signal of 8 bit COUNTER-DETECTOR 218 if a one is present in the data input signal. One bit detector output signal GTZERO 294 represents the presence or absence of a one in the 8 bit data input signal. As with 8 bit COUNTER-DETECTOR 300, the 3 bit counter output signal and the one bit detector output signal indicate the number of zeros in the 8 bit data input signal regardless of the presence of a one in the 8 bit data input signal. The 8 bit COUNTER-DETECTORS 218 could be easily modified individually or in any combination to provide a 4 bit counter output signal representing the number of leading zeros in the 8 bit data input signal regardless of the presence of a one in the 8 bit data input signal. For example, in FIG. 9, if inverter 901 and circuits 910b, 910c, and 910d are appropriately connected to GTZERO 344, ZEROCNT (2) 338a, ZEROCNT (1) 338b, and ZEROCNT (0) 338c, a 4 bit counter output signal capable of representing the number of leading zeros in an 8 bit data input signal containing all zeros will be provided in conventional binary format i.e. with bit n representing $2^n$ in base 10.

Significantly, each increment from $001_2$ to $111_2$ of ZEROCNT (2:0) 292a,b,c, represents an entire group of 8 zeros from each of the most significant of 8 bit COUNTER-DETECTORS in FIG. 2 possessing all zeros in their data input signal bits preceding the most significant 8 bit COUNTER-DETECTOR in FIG. 2 possessing a one in its data input signal. The most significant groups of bits having an absence of non-count values that precede the most significant group of bits having a non-count value ("non-count" group) may be referred to as the "count group" or the number of most significant groups of 8 bits leading a most significant non-count group. For example, in FIG. 2 assume 8 bit data input signals 238–244 contain all zeros and 8 bit data input signals 231–236 contain all ones. ZEROCNT (2:0) 292a, would equal $100_2$ or $4_{10}$ which represents the number of most significant count groups.

ADDER-CONCATENATOR 222—STRUCTURE

Figure 5:
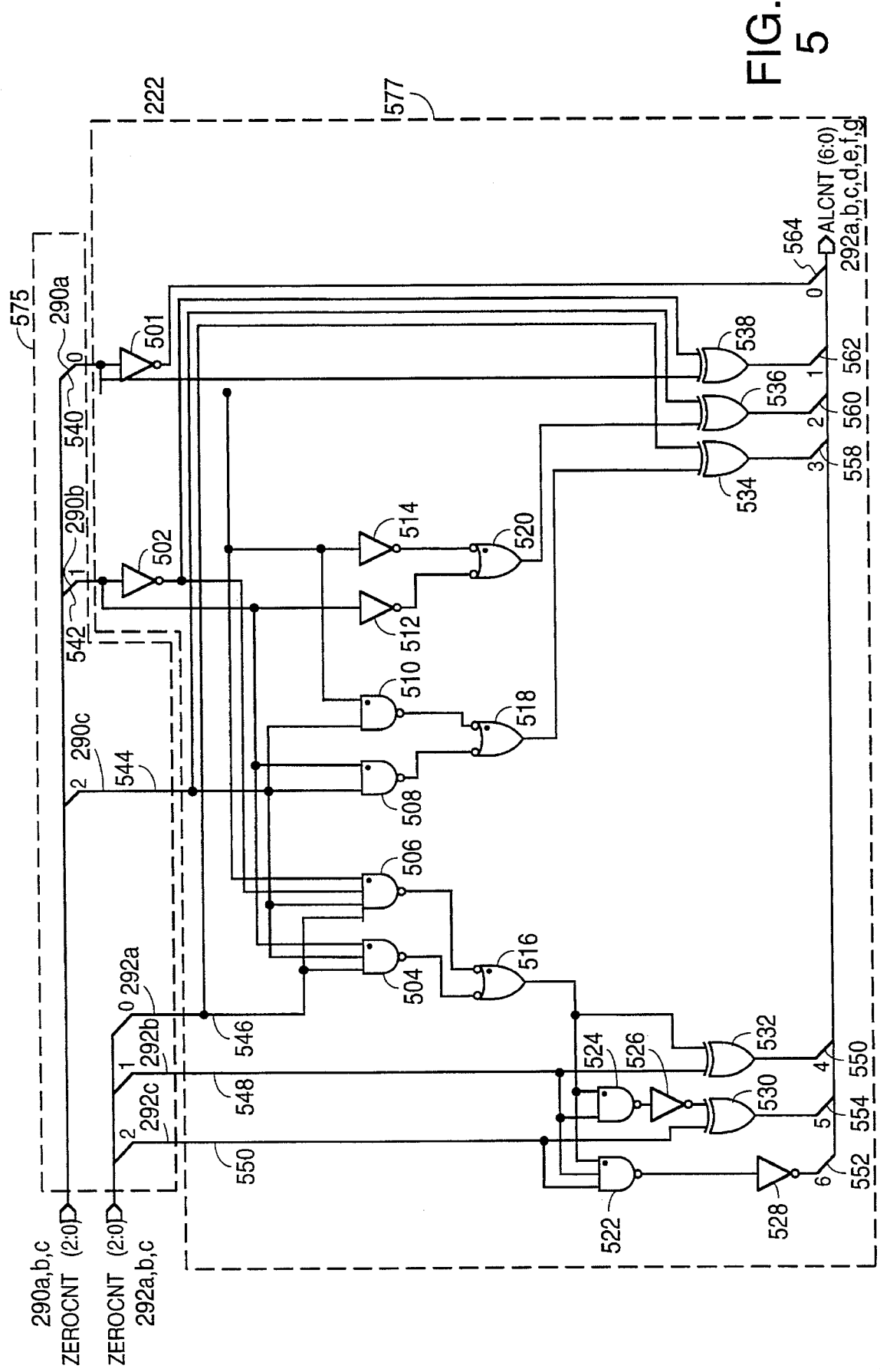
FIG. 5 illustrates a schematic diagram of an ADDER-CONCATENATOR unit employed by the 67 bit Leading Zero Indicator.

FIG. 5 illustrates a schematic diagram of ADDER-CONCATENATOR 222. ADDER-CONCATENATOR 222 is connected to 8 bit COUNTER-DETECTOR 218 and DECODER 220. As shown in FIG. 5, one suitable implementation of ADDER-CONCATENATOR 222 appropriately connects an input with data input signal lines 540–550, an output with data output signal lines 552–564, INVERTERS 501 and 502, NAND gates 504–510, INVERTERS 512–514, NAND gates 516–520, NAND gates 522 and 524, INVERTER 526 and 528, and EXCLUSIVE OR gates 530–538 to obtain adder-concatenator circuitry. Adder-concatenator 222 may be divided into concatenator circuitry 575 and adder circuitry 577.

ADDER-CONCATENATOR 222—OPERATION

In operation, ADDER-CONCATENATOR 222 performs the function of concatenating ZEROCNT (2:0) 290a,b,c to ZEROCNT (2:0) 292a,b,c with concatenator circuitry 575 and adding $11_2$ to the concatenation to obtain ADDER-CONCATENATOR's 222 seven bit data output signal ALCNT (6:0) 297a,b,c,d,e,f,g with adder circuitry 577. ADDER-CONCATENATOR 222 receives the data output signals of 8 bit DECODER 220 and COUNTER-DETECTOR 218, ZEROCNT 290a,b,c and ZEROCNT 292a,b,c, respectively. An input with data input signal lines 540–544 and 546–550 conducts data output signals ZEROCNT 290a,b,c and ZEROCNT 292a,b,c, respectively. Concatenator circuitry 575 concatenates data output signals ZEROCNT (2:0) 292a,b,c and ZEROCNT (2:0) 290a,b,c by taking the two sets of three signal lines conducting data output signals ZEROCNT (2:0) 292a,b,c and ZEROCNT (2:0) 290a,b,c and combining them into one group of six signal lines 540–550. Data input signal line 550 conducts the most significant bit of ZEROCNT (2:0) 292a,b,c, ZEROCNT (2) 292a. Data input signal line 544 conducts the most significant bit of data input signal ZEROCNT (2:0) 290a,b,c, ZEROCNT (2) 290a. An output with data output signal lines 552–564 conducts data output signal ALCNT (6:0) 297a,b,c,d,e,f,g with data output signal line 552 conducting the most significant bit. The concatenation of ZEROCNT (2:0) 290a,b,c to ZEROCNT (2:0) 292a,b,c forms a 6 bit number that represents the number of leading zeros in the least significant 64 bits of the 67 bit data input signal 230 when a single one bit is present in the least significant 64 bits. (Note: if 8 bit COUNTER-DETECTOR 218 is modified as previously mentioned to provide a 4 bit counter output signal, ADDER-CONCATENATOR 222 could be modified to concatenate the 4 bit counter output signal of 8 bit COUNTER-DETECTOR 218 with the output of DECODER 220 and adding $11_2$ to the concatenation thus providing a 7 bit output representing the number of leading zeros in the 67 bits when the 3 most significant bits 246 contain all zeros regardless of the presence of a one in the least significant 64 bits).

As previously mentioned, every increment of 8 bit COUNTER-DETECTOR 218 represents a group of 8 zeros. Therefore, if ZEROCNT (2:0) 292a,b,c is initially placed in the three most significant positions of a 6 bit data signal (such as the one conducted by concatenator circuitry's 575 data input signal lines 540–550), the most significant 3 bits of the 6 bit data output signal will represent the number of most significant zeros in the 64bit data input signal of counter circuit 226 preceding the most significant first group of eight bits from inputs 231–244 to contain a one. When the least significant 3 bits of the 6 bit data output signal represent the output of DECODER 220, the 6 bit data output signal represents the number of leading zeros in the 64 bit data input signal of counter circuit 226. ADDER-CONCATENATOR 222 incorporates this principle by concatenating ZEROCNT (2:0) 290a,b,c with ZEROCNT (2:0) 292a,b,c to form a 6 bit number. However, recognizing the possibility that the 3 most significant bits 246 of 67 bit data input signal 230 might contain all zeros, $11_2$ is added to the 6 bit concatenation. Therefore, if the 3 most significant bits 246 of 67 bit data input signal 230 are all zeros, the output of ADDER-CONCATENATOR 222 represents the number of leading zeros in the 67 bit data input signal 230 when a one is present in the input signal.

4 BIT COUNTER-DETECTOR 216—STRUCTURE

Figure 6:
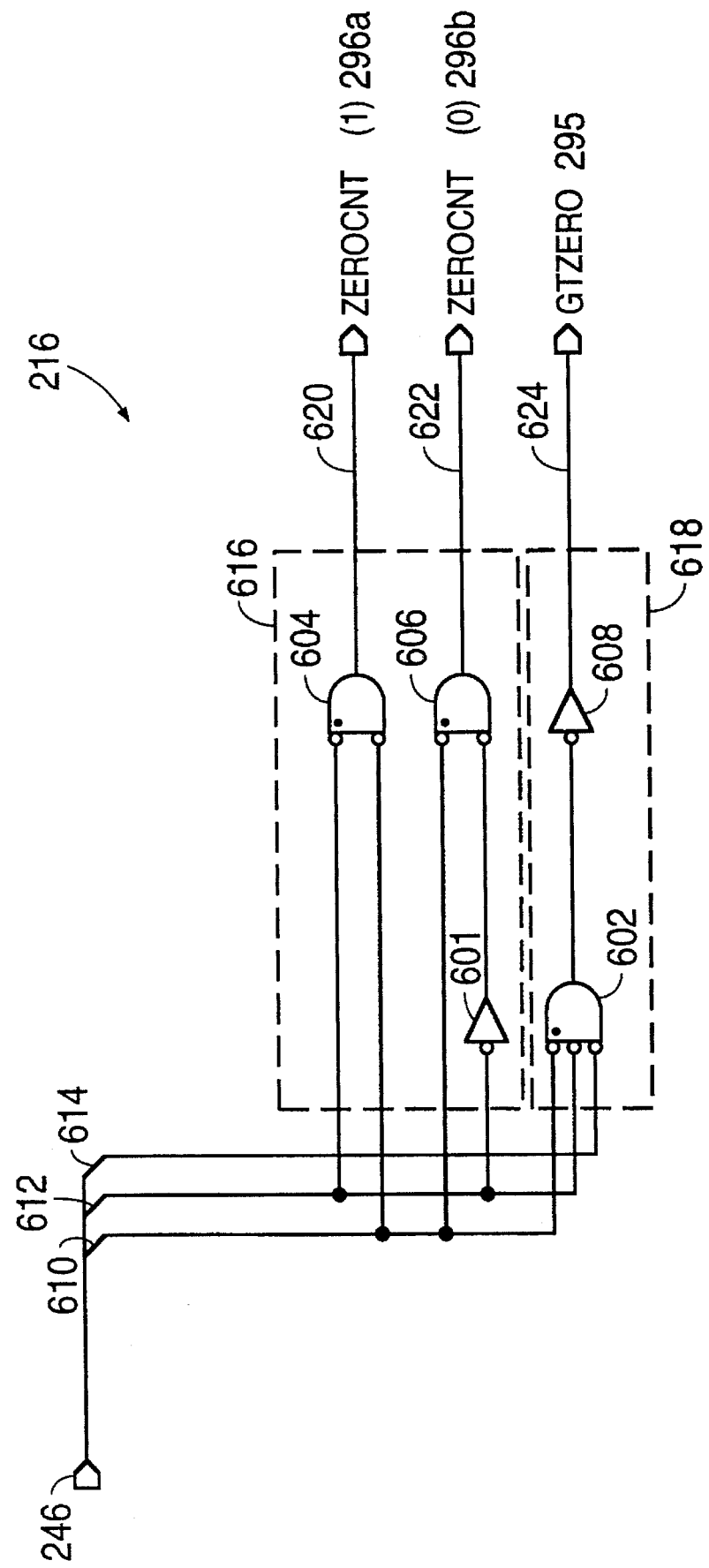
FIG. 6 illustrates a schematic diagram of a 4 bit COUNTER-DETECTOR employed by the 67 bit Leading Zero Indicator.

FIG. 6 illustrates one embodiment of the 4 bit COUNTER-DETECTOR 216. Four bit COUNTER-DETECTOR 300 receives a 3 bit data input signal 246 with each bit present sequentially on an input with data input signal lines 610–614 with input signal line 610 receiving the most significant bit. As shown in FIG. 2, 4 bit COUNTER- DETECTOR 216 receives the 3 most significant bits of 67 bit data input signal 230. Note that 4 bit COUNTER-DETECTOR 216 may be considered as a separate counter 616 combined with a separate detector 618. Four bit COUNTER-DETECTOR 216 employs counter circuitry 616 and detector circuitry 618. Counter circuitry may be implemented by appropriately connecting INVERTER 601 and NOR gates 604–606, outputs 620–624, and INVERTER 608 as shown in FIG. 6 to count the number of leading count values, zeros, conducted by data input signal lines 610–614. Detector 618 circuitry may be implemented by appropriately connecting NOR gate and INVERTER 608 as shown in FIG. 6 to detect the presence and absence of a non-count value, one, conducted by any of the data input signal lines 610–614. The 4 bit COUNTER-DETECTOR 216 has a two bit counter output signal, ZEROCNT (1) 296a, the most significant bit, and ZEROCNT (0) 296b the least significant bit, and a single bit detector output signal, GTZERO 295.

4 BIT COUNTER-DETECTOR 216—OPERATION

In operation, 4 bit COUNTER-DETECTOR 216 determines the number of leading zeros in its 3 bit data input signal 246. Data input signal lines 610–614 conduct 3 bit data input signal 246 with data input signal line 610 conducting the most significant bit. The 4 bit COUNTER-DETECTOR 216 provides a 2 bit data output signal, ZEROCNT (1) 296a and ZEROCNT (0) 296b, conducted to an output with data output signal lines 620–622, respectively. Data output signals ZEROCNT (1) 296a and ZEROCNT (0) 296b represent the number of leading zeros in 3 bit data input signal 246, when a one is present in the 3 bit data input signal 246. The 4 bit COUNTER-DETECTOR 216 also provides a single bit data output signal, GTZERO 295, conducted to the output by data output signal line 624. Data output signal, GTZERO 295, represents the presence and absence of a one in the data input signal 246. Output 624 conducts detector output signal GTZERO 295.

GTZERO 295 has two states where the first state represents the presence of a one in the data input signal 246 and a second state that represents the absence of a one in the data input signal 246. If GTZERO 295 equals one (first state), one of the 3 bits received by the 4 bit COUNTER-DETECTOR 300 in FIG. 3 equals one. If GTZERO 295 equals zero (second state), all 3 bits of the data input signal are zero. The 2 bit counter output signal and the one bit detector output signal indicate the number of leading zeros in the 3 bit data input signal 246.

MULTIPLEXER 224—STRUCTURE

Figure 7:
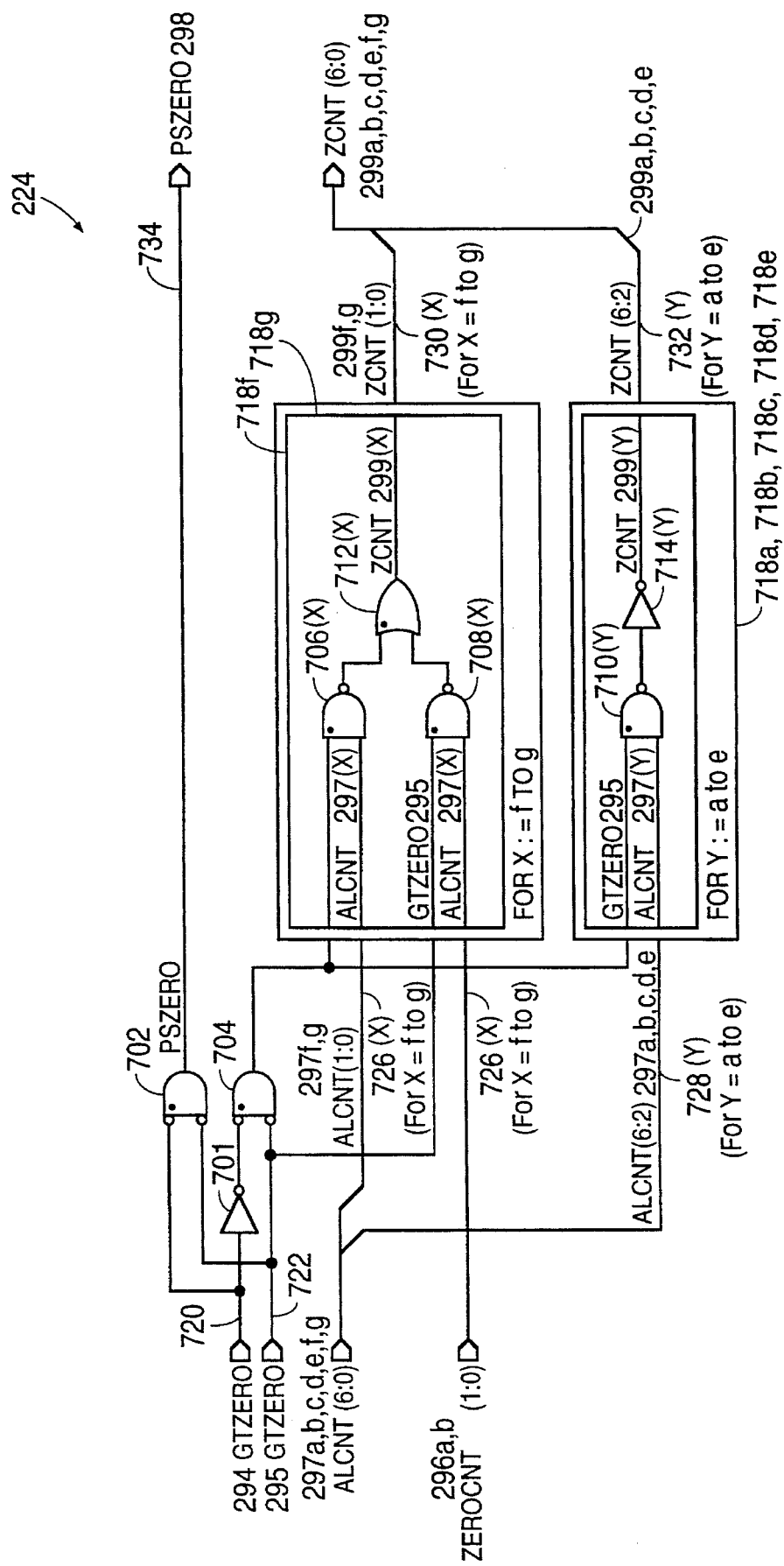
FIG. 7 illustrates a schematic diagram of a MULTIPLEXER employed by the 67 bit Leading Zero Indicator.

FIG. 7 illustrates the schematic diagram of MULTIPLEXER 224. As shown in FIG. 7, one implementation of MULTIPLEXER 224 appropriately connects INVERTER 701, NOR gates 702 and 704, data output signal lines, 734, 730(X), and 732(Y), and data input signal lines 720 and 722. MULTIPLEXER 224 is further implemented by connecting identical circuits 718a, 718b, 718c, 718d, and 718e to NOR gate 704, an output with data output signal lines 732(Y), and an input with data input signal lines 728(Y), for Y equal to "a to e". Additionally, MULTIPLEXER 224 is further implemented by connecting identical circuits 718f and 718g to NOR gate 704, an output with data output signal lines 730(X), an input with data input signal lines 724(X), and inputs 726(X) for X equal to "f to g". The implementations result in the multiplexer circuitry shown in FIG. 7.

In FIG. 7, circuits 718a, 718b, 718c, 718d, and 718e are represented schematically by a single circuit implemented by appropriately connecting NAND gate 710(Y) and INVERTER 714(Y). Note the legend "FOR Y=a to e" in the boxes surrounding circuits 718a, 718b, 718c, 718d, and 718e. The legend denotes that when "Y" is substituted with "a", circuit 718a is obtained, when "Y" is substituted with "b", circuit 718b is obtained, when "Y" is substituted with "c", circuit 718c is obtained, when "Y" is substituted with "d", circuit 718d is obtained, and when "Y" is substituted with "e", circuit 718e is obtained (note: the "(1:0)" has been omitted from the ZEROCNT 296(X) and the ALCNT 297(Y) symbology within the boxes surrounding circuits 718a, 718b, 718c, 718d, and 18e, 718f, and 718g). In FIG. 7, circuits 718f and 718g are represented schematically by a single circuit implemented by appropriately connecting NAND gates 706(X) and 708(X) and NAND gate 712(X). Note the legend "FOR X=f to g" in the boxes surrounding circuits 718f and 718a. The legend denotes that when "X" is substituted with "f", circuit 718f is obtained and when "X" is substituted with "g", circuit 718g is obtained. Circuits 718a, 718b, 718c, 718d, and 718e provide the most significant bit through the fifth most significant bit, (ZCNT (6:2) 299a,b,c,d,e) respectively, of data output signal ZCNT (6:0) 299a,b,c,d,e,f,g. Circuits 718f and 718g provide the sixth most significant and least significant bits, (ZCNT (1:0) 299f,g) respectively, of data output signal ZCNT (6:0) 299a,b,c,d,e,f,g.

MULTIPLEXER 224—OPERATION

In operation, MULTIPLEXER 224 receives 4 data input signals. The data input signals are GTZERO 294, GTZERO 295, ZEROCNT (1:0) 296a, and ALCNT (6:0) 297a,b,c,d, e,f,g. An input with data input signal lines 720 and 722 conducts detector data input signals GTZERO 294 and GTZERO 295, respectively. ALCNT (6:0) 297a,b,c,d,e,f,g is segmented such that an input with data input signal lines 728(Y) and 724(X) conducts data input signals ALCNT (6:2) 297a,b,c,d,e (ALCNT 297(Y)) and ALCNT (1:0) 297f,g (ALCNT 297(X)), respectively. An input with data input signal lines 726(X) conducts data input signals ZEROCNT (1:0) 296a,b (ZEROCNT 296(X)), respectively. MULTIPLEXER 224 provides the 7 bit data output signal ZCNT (6:0) 299a,b,c,d,e,f,g and one bit data output signal PSZERO 298 indicating the number of leading zeros in the original 67 bit data input signal. An output with data signal output lines 732(Y) and 730(X) conducts data output signals ZCNT (6:2) 299a,b,c,d,e (ZCNT 299(Y)) and ZCNT (1:0) 299f,g (ZCNT 299(X)), respectively. An output with data output signal line 734 conducts data output signal PSZERO 298. Circuits 716a, 716b, 718a, 718b, 718c, 718d, and 718e allow ALCNT (6:0) 297a,b,c,d,e,f,g to communicate to the output of MULTIPLEXER 224 (represented by 7 bit data output signal ZCNT (6:0) 299a,b,c,d,e,f,g) if GTZERO 294 equals $1_2$ and GTZERO 295 equals $0_2$ which indicates there are no ones in the data input signal 246 of 4 bit COUNTER-DETECTOR 216. If a one is detected in 4 bit COUNTER-DETECTOR 216, as reflected by GTZERO 295 equal $0_2$, ZCNT (6:0) 299a,b,c,d,e,f,g will equal the number of zeros in the data input signal 246 of 4 bit COUNTER-DETECTOR 216 which equals the number of leading zeros in the three most significant bits of 67 bit data input signal 230. If all 67 bits of input signal 230 are zero, indicated by GTZERO 294 equals $0_2$ and GTZERO 295 equals $0_2$, then a single bit data output signal PSZERO 298 of MULTIPLEXER 224 equals one and ZCNT (6:0) 299a,b,c,d,e,f,g equals $0000000_2$ which indicates that all 67 bits of input signal 230 are zero. PSZERO 298 equals zero if there is a one present in any of the 67 bits of the original 67 bit data input signal 230. GTZERO 294 and GTZERO 295 are instrumental in allowing MULTIPLEXER 224 to select the correct output to indicate the number of leading zeros in the 67 bit data input signal 230.

67 BIT LEADING BIT INDICATOR—EXAMPLE

The following is an example illustrating an embodiment of the 67 bit leading bit indicator. It will be assumed for this example that each bit of 67 bit data input signal 230 is capable of possessing two possible values denoted as ones and zeros. It will be further assumed that leading zeros are to be determined, therefore, zeros are denoted here as "count bits" and ones are "non-count bits." Using a 67 bit data input signal 230 of 000 (group A), 00000000 (group B), 00000000 (group C), 00000000 (group D), 00000010 (group E), 11110000 (group F), 00101011 (group G), 00000000 (group H), 00000001 (group J) (spaces and group labels have been provided for clarity), the 67 data input signal bits are applied sequentially to COUNTER-DETECTORS 216–201, respectively. The 4 bit COUNTER-DETECTOR 216 receives data input signal 246 which contains the three most significant bits, 000 (group A). The most significant 8 bit COUNTER-DETECTOR 214 receives data input signal 244 which contains the most significant group of 8 bits, 00000000 (group B). The second most significant 8 bit COUNTER-DETECTOR 212 receives data input signal 242 which contains the second most significant group of 8 bits, 00000000 (group C). The third most significant 8 bit COUNTER-DETECTOR 210 receives data input signal 240 which contains the third most significant group of 8 bits, 00000000 (group D). The fourth most significant 8 bit COUNTER-DETECTOR 208 receives data input signal 238 which contains the fourth most significant group of 8 bits, 00000010 (group E). The fifth most significant 8 bit COUNTER-DETECTOR 206 receives data input signal 236 which contains the fifth most significant group of 8 bits, 11110000 (group F). The sixth most significant 8 bit COUNTER-DETECTOR 201 receives data input signal 234 which contains the sixth most significant group of 8 bits, 00101011 (group G). The seventh most significant 8 bit COUNTER-DETECTOR 204 receives data input signal 232 which contains the seventh most significant group of 8 bits, 00000000 (group H). The least significant 8 bit COUNTER-DETECTOR 202 receives data input signal 231 which contains the least significant group of 8 bits, 00000001 (group J).

The 4 bit COUNTER-DETECTOR 216 will have counter output signals ZEROCNT (1:0) 296$a,b=10_2$ i.e. ZEROCNT (1) 296$a=1_2$ and ZEROCNT (0) 296$b=0_2$ and detector output signal GTZERO 295 $=0_2$. The 8 bit COUNTER-DETECTOR 214 will have counter output signals ZEROCNT (2:0) 280$a,b,c=111_2$, and detector output signal GTZERO 270$=0_2$. The 8 bit COUNTER-DETECTOR 212 will have counter output signals ZEROCNT (2:0) 281$a,b,c=111_2$ and detector output signal GTZERO 271$=0_2$. The 8 bit COUNTER-DETECTOR 210 will have counter output signals ZEROCNT (2:0) 282$a,b,c=111_2$ and detector output signal GTZERO 272$=0_2$. The 8 bit COUNTER-DETECTOR 208 will have counter output signals ZEROCNT (2:0) 283$a,b,c=110_2$ and detector output signal GTZERO 273$=1_2$. The 8 bit COUNTER-DETECTOR 208 is, therefore, the most significant 8 bit COUNTER-DETECTOR with a one in its 8 bit data input signal, i.e. the most significant non-count group. The 3 bits represented by ZEROCNT (2:0) also indicate the location of the first non-count bit or one i.e. the seventh position. The 8 bit COUNTER-DETECTOR 206 will have counter output signals ZEROCNT (2:0) 284$a,b,c=000_2$ and detector output signal GTZERO 274$=1_2$. The 8 bit COUNTER-DETECTOR 204 will have counter output signals ZEROCNT (2:0) 285$a,b,c=111_2$ and detector output signal GTZERO 274$=0_2$. The 8 bit COUNTER-DETECTOR 202 will have counter output signals ZEROCNT (2:0) 286$a,b,c=111_2$ and detector output signal GTZERO 276$=0_2$. The 8 bit COUNTER-DETECTOR 201 will have counter output signals ZEROCNT (2:0) 287$a,b,c=111_2$ and detector output signal GTZERO 277$=1_2$.

GTZERO 270–277 is received sequentially by 8 bit COUNTER-DETECTOR 218. The 8 bit COUNTER-DETECTOR 218 will have counter output signals ZEROCNT (2:0) 292$a,b,c=011_2$, which represents the number of most significant count groups, and detector output signal GTZERO 294$=1_2$. DECODER 220 receives the outputs of 8 bit COUNTER-DETECTORS 214–201 and communicates ZEROCNT (2:0) 283$a,b,c$ to an output as data output signal ZEROCNT (2:0) 290$a,b,c=110_2$ because 8 bit COUNTER-DETECTOR 208 is the most significant 8 bit COUNTER-DETECTOR to contain a one in its 8 bit data input signal.

ADDER-CONCATENATOR 222 concatenates ZEROCNT (2:0) 292$a,b,c=011_2$ with ZEROCNT (2:0) 290$a,b,c=110_2$ to form a 6 bit concatenation $011110_2$ and then adds $11_2$ so that ADDER-CONCATENATOR'S 222 output ALCNT (6:0) 297$a,b,c,d,e,f,g= 0100001_2$ is the concatenation plus the number of bits in excess of the least significant 64 bits. MULTIPLEXER 224 receives data input signals GTZERO 294$=1_2$, GTZERO 295$=0_2$, ZEROCNT (1:0) 296$a,b,=11_2$, and ALCNT (6:0)$=0100001_2$. Because GTZERO 294 equaled $1_2$, PSZERO 298 equals $0_2$. Because GTZERO 294$=1_2$ and GTZERO 295$=0_2$, MULTIPLEXER 224 provides 7 bit data output signal ZCNT (6:0) 299$a,b,c,d,e,f,g=0100001_2$ which equals the number of leading zeros in the original 67 bit data input signal 230.

64 BIT LEADING ZERO INDICATOR

Figure 8A:
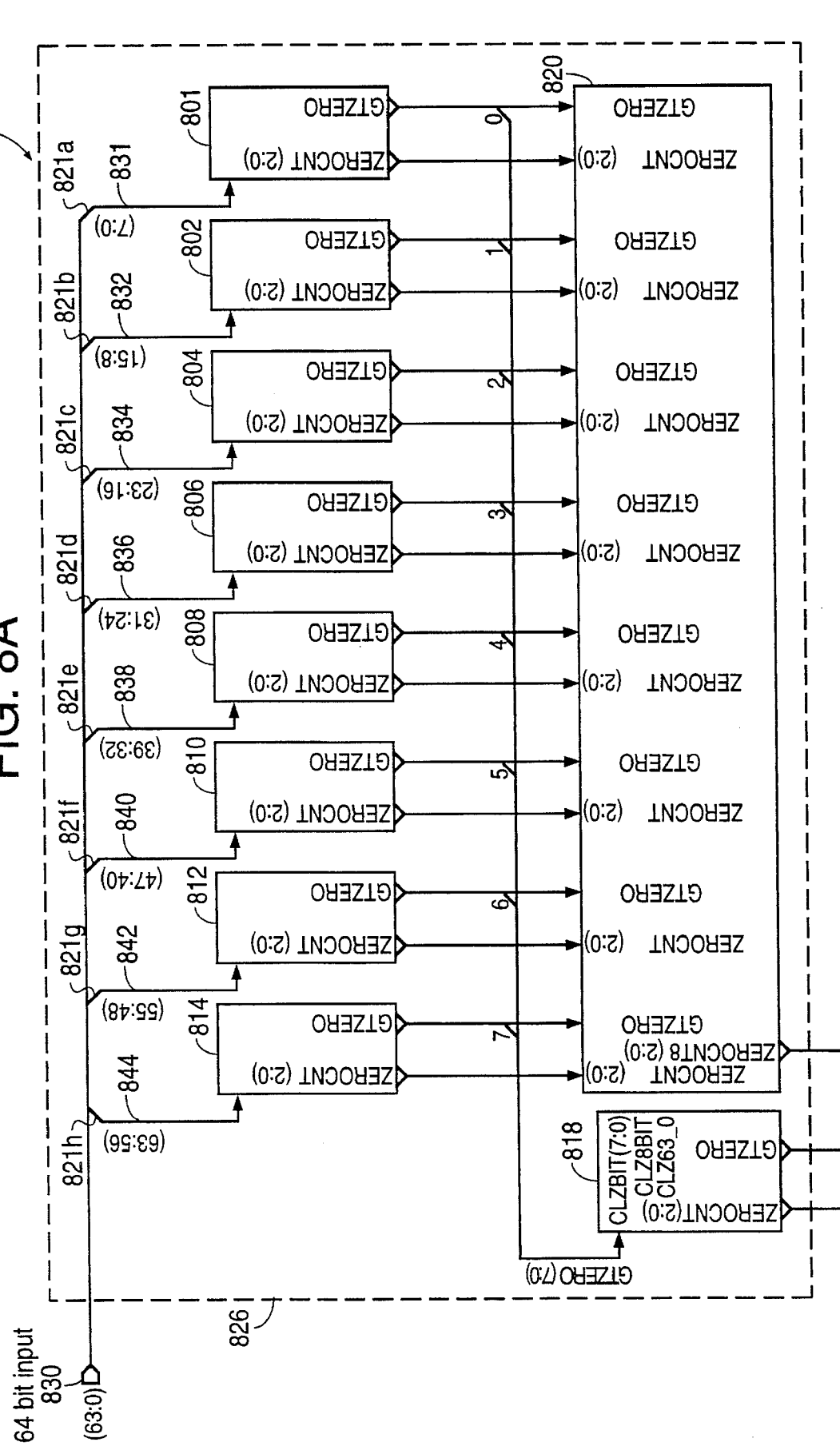
FIG. 8 illustrates a schematic diagram of a 64 bit Leading Zero Indicator.

FIG. 8 illustrates a block diagram of a 64 bit Leading Zero Indicator 800. The 64 bit Leading Zero Indicator 800 is designed to determine the number of leading zeros in a 64 bit data input signal 830 received in parallel and consists of counter circuit 826 and CONCATENATOR-MULTIPLEXER 824. Counter circuit 826 is identical to counter circuit 226. The difference between the 64 bit Leading Zero Indicator of FIG. 8 and the 67 bit Leading Zero Indicator of FIG. 2 is that the 4 bit COUNTER-DETECTOR 216 is not needed and ADDER-CONCATENATOR 222 and MULTIPLEXER 224 are replaced by CONCATENATOR-MULTIPLEXER 824.

CONCATENATOR-MULTIPLEXER 824 includes an input with input data signal lines 914, 916(X), and 918(Y) for receiving three data input signals, GTZERO 894, ZEROCNT (2:0) 890$e,f,g$ and ZEROCNT (2:0) 892$b,c,d$. GTZERO 894 is a single bit detector data input signal from 8 bit COUNTER-DETECTOR 818 representing the presence or absence of a one in 8 bit COUNTER-DETECTOR 818's data input signal. ZEROCNT (2:0) 890$e,f,g$ is a 3 bit counter data input signal from DECODER 820 representing the number of leading zeros in the most significant 8 bit COUNTER-DETECTOR in FIG. 8 to contain a one in its data input signal. ZEROCNT (2:0) 892$b,c,d$ is a 3 bit data input signal from 8 bit COUNTER-DETECTOR 818 representing the number of 8 bit groups of zeros contained in the 64 bit data input signal 830 before a one is detected. CONCATENATOR-MULTIPLEXER 824 provides a seven bit data output signal ZCNT (6:0) 899$a,b,c,d,e,f$ representing the number of leading zeros in the original 64 bit data input signal.

CONCATENATOR-MULTIPLEXER 824—STRUCTURE

Figure 9:
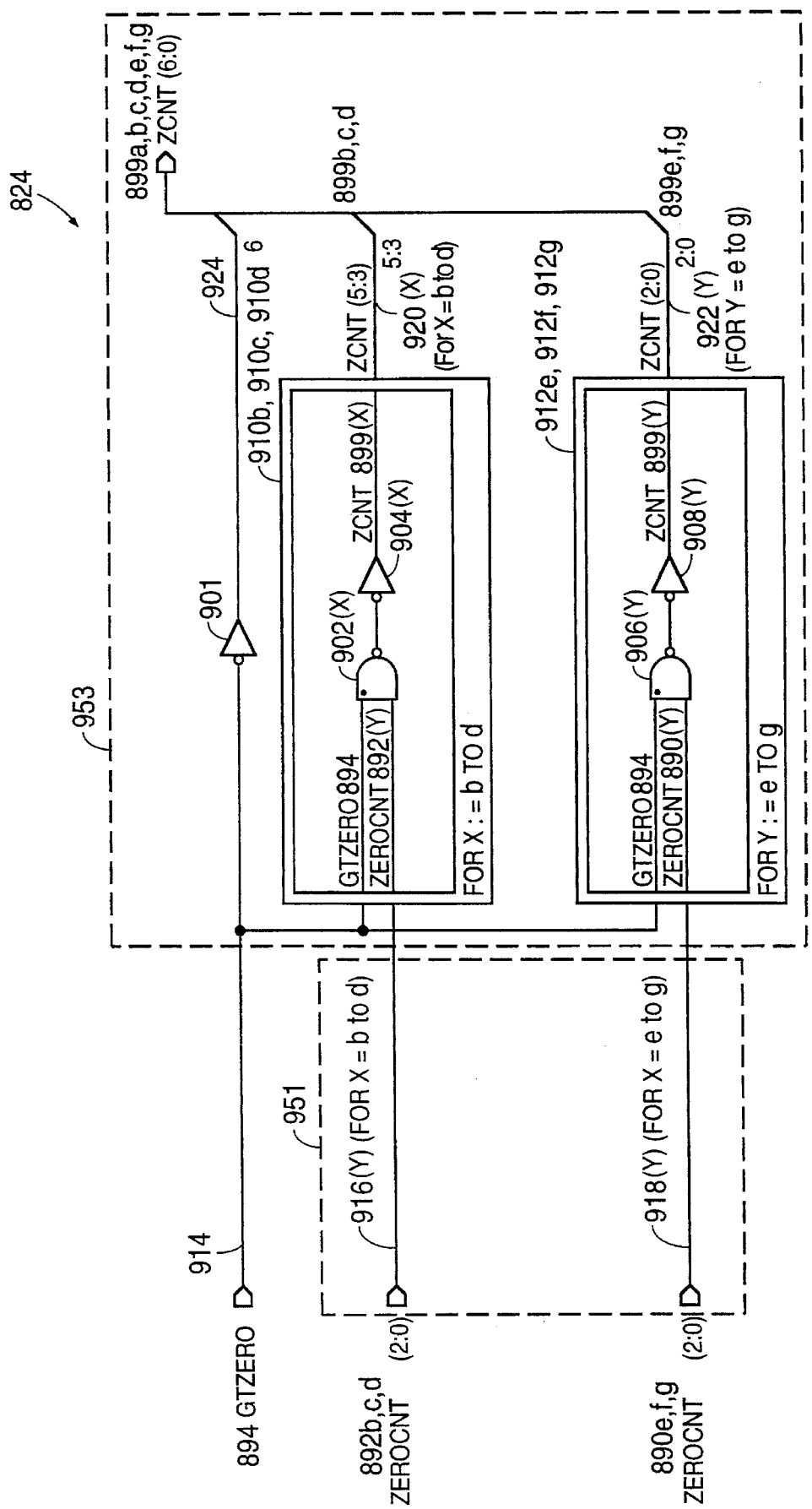
FIG. 9 illustrates a schematic diagram of a CONCATENATOR-MULTIPLEXER employed by the 64 bit Leading Zero Indicator.

FIG. 9 illustrates the schematic diagram of CONCATENATOR-MULTIPLEXER 824 constituting concatenator-multiplexer circuitry. One implementation of CONCATENATOR-MULTIPLEXER 824 connects INVERTER 901, identical circuits 910$b$, 910$c$, and 910$d$, an input with data input signal line 914, an output with data output signal line 924, and identical circuits 912$e$, 912$f$, and 912$g$ as shown in FIG. 9. CONCATENATOR-MULTIPLEXER 824 is further implemented by appropriately connecting circuits 910$b$, 910$c$, and 910$d$ to data input signal line 914, the input with data input signal lines 916(X), and the output with data output signal lines 920(X) as shown in FIG. 9. Data input signal line 914 conducts detector data input signal GTZERO 894, and data input signal lines 916(X) conduct data input signal ZEROCNT (2:0) 892$b,c,d$. data output signal lines 920(X) conduct data output signal ZCNT (5:3) 899$b,c,d$. Additionally, CONCATENATOR-MULTIPLEXER 824 is further implemented by appropriately connecting circuits 912$e$, 912$f$, and 912$g$ to data input signal line 914, the input with data input signal lines 918(Y), and the output with data output signal lines 922(Y) as shown in FIG. 9. Data input signal lines 918(Y) conduct data input signal ZEROCNT (2:0) 890$e,f,g$, and data output signal lines 922(Y) conduct data output signal ZCNT (2:0) 899$e,f,g$.

In FIG. 9, circuits 910$b$, 910$c$, and 910$d$ are represented schematically by a single circuit implemented by appropriately connecting NAND gates 902(X) and INVERTERS 904(X). Note the legend "FOR Y=b to d" in the boxes surrounding circuits 910$b$, 910$c$, and 910$d$. The legend denotes that when "Y" is substituted with "b", circuit 910$b$ is obtained, when "Y" is substituted with "c", circuit 910$c$ is obtained, and when "Y" is substituted with "d", circuit 910$d$ is obtained (note: the "(2:0)" has been omitted from the ZEROCNT 892(Y) symbology within the boxes surrounding circuits 910$b$, 910$c$, and 910$d$). One suitable implementation of circuits 912$e$, 912$f$, and 912$g$ appropriately connects NAND gates 906(Y) and INVERTERS 908(Y) as shown in FIG. 9. Note the legend "FOR Y=e to g" in the boxes surrounding circuits 912$e$, 912$f$, and 912$g$. The legend denotes that when "Y" is substituted with "e", circuit 912$e$ is obtained, when "Y" is substituted with "f", circuit 912$f$ is obtained, and when "Y" is substituted with "g", circuit 912$g$ is obtained (note: the "(2:0)" has been omitted from the ZEROCNT 890(Y) symbology within the boxes surrounding circuits 912$e$, 912$f$, and 912$g$). INVERTER 901 provides the most significant bit, ZCNT (6) 899$a$, of data output signal ZCNT (6:0) 899$a,b,c,d,e,f,g$. Circuits 910$b$, 910$c$ and 910$d$ provide the second, third, and fourth most significant bits, (ZCNT (5:3) 899$b,c,d$) respectively, of data output signal ZCNT (6:0) 899$b,c,d,e,f,g$. Circuits 912$e$, 912$f$, and 912$g$ provide the fifth, sixth, and least most significant bits, (ZCNT (2:0) 899$e,f,g$) respectively, of data output signal ZCNT (6:0) 899$a,b,c,d,e,f,g$. Concatenator-multiplexer 824 may be divided into concatenator circuitry 951 and multiplexer circuitry 953.

CONCATENATOR-MULTIPLEXER 824—OPERATION

In operation, CONCATENATOR-MULTIPLEXER 824 performs the function of concatenating data signals ZEROCNT (2:0) 892$b,c,d$ and ZEROCNT (2:0) 890$e,f,g$ with concatenator circuitry 951 and selecting the output correctly representing the number of leading zeros in the 64 bit data input signal 830. Concatenator circuitry 951 concatenates data output signals ZEROCNT (2:0) 892$a,b,c$ and ZEROCNT (2:0) 890$a,b,c$ by taking the two sets of three signal lines conducting data output signals ZEROCNT (2:0) 292$a,b,c$ and ZEROCNT (2:0) 290$a,b,c$ and combining them into one group of six signal lines 916(X) and 918(Y). CONCATENATOR-MULTIPLEXER 824 receives data input signals GTZERO 894, ZEROCNT 892$b,c,d$ and ZEROCNT 890$e,f,g$ and provides an output signal, ZCNT (6:0) 899$a,b,c,d,e,f,g$, indicating the number of leading zeros in the 64 bit data input signal 830. If GTZERO 894 is a zero, indicating that the original 64 bit data input signal 830 contained all zeros, inverter 901 provides a data output signal ZCNT(6) 899$a$=$1_2$ and circuits 910$b$, 910$c$, and 910$d$ provide data output signals ZCNT(5) 899$b$=$0_2$, ZCNT(4) 899$c$=$0_2$, and ZCNT(3) 899$d$=$0_2$. Also, circuits 912$e$, 912$f$, and 912$g$ provide data output signals ZCNT(2) 899$e$=$0_2$, ZCNT(1) 899$f$=$0_2$, and ZCNT(0) 899$g$=$0_2$ i.e. ZCNT (6:0) 899$a,b,c,d,e,f,g$ equals $1000000_2$. If GTZERO 894 is a one, then ZCNT (6) 899$a$ is a zero and CONCATENATOR-MULTIPLEXER 824 concatenates ZEROCNT (2:0) 892$b,c,d$ to ZEROCNT (2:0) 890$e,f,g$. As a result, CONCATENATOR-MULTIPLEXER'S 824 output ZCNT (6) 899$a$ equals $0_2$ followed by the result of the concatenation. Therefore, on the basis of GTZERO 894, CONCATENATOR-MULTIPLEXER 824 selects whether data output signal ZCNT (6:0) 899$a,b,c,d,e,f,g$ represents the concatenation or $1000000_2$, which represents the number of bits in the 64 bit input signal and indicates that all bits of the 64 bit data input signal 830 equaled zero. Therefore, if the 64 bit data input signal 830 contains a $1_2$, i.e. a non-count bit for a leading zero indicator, the concatenation represents the number of leading zeros in the 64 bit data input signal 830. For example, if GTZERO 894=$1_2$, ZEROCNT (2:0) 892$b,c,d$=$010_2$, and ZEROCNT (2:0) 890$e,f,g$=$110_2$, the concatenation of ZEROCNT (2:0) 892$b,c,d$ and ZEROCNT (2:0) 890$e,f,g$=$010110_2$, and data output signal ZCNT (6:0) 899$a,b,c,d,e,f,g$=$0010110_2$. The data output signal ZCNT (6:0) 899$a,b,c,d,e,f,g$ equals the number of leading zeros in the original 64 bit data input signal 830.

The aforementioned embodiments are just some of the many possible embodiments. For example, a 128 bit Leading Zero Indicator could be obtained by duplicating the 64 bit Leading Zero Indicator 800 with the exception of the CONCATENATOR-MULTIPLEXER 824. A modified CONCATENATOR-MULTIPLEXER 824 would be provided that would be capable of receiving signals representing the number of the most significant groups of 8 bits containing all zeros in both the most significant group of 64 bits and the least significant group of 64 bits. Likewise, the modified CONCATENATOR-MULTIPLEXER 824 could provide an output representing the number of leading zeros in the most significant group of 64 bits. If the most significant group of 64 bits did not contain a one, then the modified CONCATENATOR-MULTIPLEXER 824 could provide an output representing the number of leading zeros in the least significant group of 64 bits. Otherwise if all 128 bits were zeros, then the modified CONCATENATOR-MULTIPLEXER 824 could provide an output representing all 128 bits.

In a modification of the foregoing, four of the 8 bit COUNTER-DETECTORS of FIG. 8 are removed and the DECODER is modified to conduct a reduced number of data input signals proportional to the decrease in the number of 8 bit COUNTER-DETECTORS. In a further modification to determine a number leading zeros in a 32 bit data input signal each of the 8 bit COUNTER-DETECTORS 801–814 is replaced with 4 bit COUNTER-DETECTORS. The 4 bit COUNTER-DETECTORS would provide 2 bit outputs representing the number of leading zeros in their data input signal if a one is present. Also, the MULTIPLEXER 824 would be modified to concatenate a 2 bit from the DECODER 820 with the data input signal from a 4 bit COUNTER-DETECTOR that determined a number of the most significant groups of 4 bits containing all zeros preceding the most significant group containing a one. If the 32 bit data input signal contained all zeros, the modified MULTIPLEXER 824 would provide an output representing a 32 bit number.

It will be appreciated that described herein are generally the apparatus and method for determining a number of digits leading a particular digit ("leading digit indicator"). A leading digit indicator pertains to a device used to determine a number of particular count digits in a data signal that lead or precede a non-count digit. Each digit has a value, represented by a zero, one, two, three, four, or any other nomenclature. The values may each represent a specific voltage level such as 0 Volts, 3 Volts, 5 Volts, or any other useful voltage level. It may be desirable to determine a number of leading count digits in a data input signal with R plus X groups of M digits. Each digit would represent either a count digit or a non-count digit. A count digit is a digit whose value it is desirable to count. A non-count digit is a digit whose value it is not desirable to count. Leading count digits are the most significant digits in a data input signal, having any number of digits, that precede (or are more significant than) the most significant non-count digit. The data input signal may be segmented into R most significant digits and a remainder of X groups of M bits where each digit may be represented by any of N possible values. The N possible values may be count values and non-count values. The number of leading count digits in the X groups of M digits may be indicated by concatenating the number of most significant groups of M digits to the number of leading count digits in the most significant group of M digits with a non-count digit. The number of leading count digits in the most significant group of M digits with a non-count digit is represented by Z digits where $M=N^Z$ (R, X, M, and Z are non-negative integers). The number of leading count digits in the entire data signal may be indicated by the number of leading count digits in the R most significant digits or in the concatenation plus R if the R most significant digits contain only count digits.

Therefore, the methods and apparatus described herein generally may be used to determine the number of leading count digits (or bits in a binary digit system). For example, each bit may have up to two values represented, for example, by ones and zeros, or each digit may have up to three values represented, for example, by twos, ones, and zeros, in a data input signal containing any number of values. For example, assume that a 32 digit data input signal with each digit represented by one of three possible values can be represented by 0001 (group A) 111110000 (group B) 010102011 (group C) 010120011 (group D). The 32 digit data input signal may be divided, as above, into the 4 most significant digits (group A) with a remainder of 3 groups of 9 digits (groups B, C, and D) i.e. Q equals 32, X equals 3, M equals 9, N equals 3, and R equals 4. Assuming that "2" is the non-count value, the number of leading count digits in the most significant group of 9 digits containing a non-count value (group C), is $12_3$ (i.e. $5_{10}$) which notably is represented by two digits (i.e. $9=3^{(Z=number\ of\ digits)}$. The number of most significant groups of 9 digits preceding group C is $1_3$ (group B). Concatenating, results in $112_3$ (i.e. $14_{10}$) which represents the number of leading count values in groups B, C, and D. Because R is non-zero and does not contain a non-count value, R is added to the concatenation to obtain $200_3$ (i.e. $18_{10}$). Therefore, the number of leading count values in the 32 digit example equals $200_3$.

It may be apparent that many other modifications are possible without departing from the scope of the present invention as set forth in the appended claims.

What is claimed is:

1. An apparatus to determine a number of leading count digits in a data input signal, the data input signal having X groups of M digits, each digit having one of N possible values comprised of count values and non-count values, the apparatus comprising:

a first input to receive a first data input signal, the first data input signal being indicative of a number of most significant groups of the X groups of M digits leading a most significant non-count group, wherein the most significant non-count group is a most significant group of the X groups of M digits having a non-count digit, wherein a non-count digit is a digit having a non-count value;

a second input to receive a second data input signal, the second data input signal being indicative of a number of leading count digits in the most significant non-count group, wherein a count digit is a digit having a count value; and concatenator circuitry, coupled to the first input and second input, to concatenate the first data input signal and the second data input signal to form a concatenation signal representing the number of leading count digits in the X groups of M digits in the data input signal;

wherein the second data input signal is represented by Z digits where $M=N^Z$ and X, M, N, and Z are non-negative integers.

2. An apparatus as in claim 1, wherein X equals 8, M equals 8, and Z equals 3, and N equals 2.

3. An apparatus as in claim 1, wherein the concatenation signal has 2 times Z digits.

4. An apparatus as in claim 1, wherein N equals 2 and wherein the two values are represented by a logical "0" and a logical "1".

5. An apparatus as in claim 1, wherein the first data input signal in the concatenation signal occupies the most significant digits of the concatenation signal.

6. An apparatus to determine a number of leading count digits in a data input signal as in claim 1, the apparatus further comprising:

a third input to receive a third data input signal, the third data input signal having a first state when a non-count digit is present in the X groups of M digits and a second state when a non-count digit is absent in the X groups of M digits; and multiplexer circuitry, coupled to the concatenator circuitry and to the third input, responsive to the third data input signal to provide a data output signal representing the concatenation signal when the multiplexer circuitry receives the third data input signal having the first state and to provide a data output signal representing the absence of a non-count digit in the data input signal when the multiplexer circuitry receives the third data input signal having the second state.

7. An apparatus as in claim 6, wherein the concatenator and multiplexer are compositely comprised of:

a 1 bit data input having a node;

a first 3 bit data input having three nodes;

a second 3 bit data input having three nodes;

a 7 bit data output having seven nodes;

a first INVERTER having an input coupled to said node of said 1 bit data input and an output coupled to a most significant node of said 7 bit data output;

a first logic circuit having first, second, and third NAND gates and first, second and third INVERTERS, said first, second, and third NAND gates each having a first input coupled to said node of said 1 bit data input signal, each having a second input coupled to the most significant, second most significant, and least significant nodes of said first 3 bit data input, respectively, and each having an output, wherein said second, third, and fourth INVERTERS each having an input coupled to said outputs of said first, second, and third NAND gates, respectively, and each having an output coupled to second, third, and fourth most significant nodes of said 7 bit data output, respectively; and a second logic circuit having fourth, fifth, and sixth NAND gates and fifth, sixth, and seventh INVERTERS, wherein said fourth, fifth, and sixth NAND gates each having a first input coupled to a most significant, second most significant, and least significant node of said second 3 bit data input, respectively, each having a second input coupled to said node of said 1 bit data input, and having an output, wherein said fifth, sixth, and seventh INVERTERS each having an input coupled to said outputs of said fourth, fifth, and sixth NAND gates, respectively, and each having an output coupled to fifth most significant, sixth most significant, and least significant nodes of said 7 bit data output, respectively.

8. An apparatus to determine a number of leading count digits in a data input signal as in claim 1, wherein the data input signal further comprises R most significant digits, each digit having one of N possible values comprised of count values and non-count values, the apparatus further comprising:

a third input to receive a third data input signal, the third data input signal being indicative of a number of leading count digits in the R most significant digits and the presence and absence of a non-count digit in the R most significant digits;

adder circuitry, coupled to the concatenator circuitry to receive the concatenation signal, to add R to the concatenation signal to form a concatenation plus R signal, wherein the adder circuitry includes an output to communicate the concatenation plus R signal; and multiplexer circuitry, coupled to the adder output to receive the concatenation plus R signal and to the third input to receive the third data input signal, wherein the multiplexer includes an output to provide a data output signal representing the concatenation plus R signal when the third data input signal indicates the absence of a non-count digit in the R most significant digits and to provide a data output signal representing the number of leading count digits in the R most significant digits when the third data input signal indicates the presence of a non-count digit in the R most significant digits.

9. An apparatus as in claim 8, wherein X equals 8, M equals 8, and Z equals 3, N equals 2, and R equals 3.

10. An apparatus as in claim 8, wherein the adder circuitry and concatenator are compositely comprised of:

a first 3 bit data input having three nodes;

a second 3 bit data input having three nodes;

a 7 bit data output having seven nodes; and first through ninth NAND gates each having an output and a plurality of inputs, first through sixth INVERTERS each having an input and an output, first through fifth EXCLUSIVE OR gates each having an output and a plurality of inputs, wherein said first NAND gate having first, second, and third inputs coupled to a most significant node and a second most significant node of said first 3 bit input signal, and said output of said fifth NAND gate, respectively, and having an output coupled to said input of said first INVERTER, said second NAND gate having first and second inputs coupled to said second and third inputs of said first NAND gate, respectively, and an output coupled to said input of said second INVERTER, said third NAND gate having first, second, and third inputs coupled to a least significant node of said first 3 bit data input, a most significant node of said second 3 bit data input, and a second most significant node of said second 3 bit data input, respectively, and an output coupled to a first input of said fifth NAND gate, said fourth NAND gate having first, second, third, and fourth inputs coupled to said first input of said third NAND gate, said second input of said second NAND gate, to said output of said third INVERTER, and to a least significant node of said second 3 bit data input signal, respectively, and an output coupled to a second input of said fifth NAND gate, said sixth NAND gate having first and second inputs coupled to said most significant and second most significant nodes of said second 3 bit data input, respectively, and an output coupled to a first input of said eighth NAND gate, said seventh NAND gate having first and second inputs coupled to said most significant and least significant nodes of said second 3 bit data input, respectively, and an output coupled to a second input of said eighth NAND gate, said eighth NAND gate having an output coupled to a first input of said third EXCLUSIVE OR gate, said ninth NAND gate having first and second inputs coupled to said outputs of said fourth and fifth INVERTERS, respectively, and an output coupled to a first input of said fourth EXCLUSIVE OR gate, said first INVERTER having an output coupled to a most significant node of said 7 bit data output, said second INVERTER having an output coupled to a second input of said first EXCLUSIVE OR gate, said third input having an input coupled to said second most significant node of said second 3 bit data input, said fourth INVERTER having an input coupled to said input of said third INVERTER, a fifth INVERTER having an input coupled to said least significant node of said second 3 bit data input, and said sixth INVERTER having an input coupled to said input of said fifth INVERTER and an output coupled to a least significant node of said 7 bit data output, and said first EXCLUSIVE OR gate having a first input coupled to said most significant node of said first 3 bit data input and having an output coupled to a second most significant node of said 7 bit data output, said second EXCLUSIVE OR gate having first input and second inputs coupled to said second most significant node of said first 3 bit data input signal and to said output of said fifth NAND gate, respectively, and an output coupled to a third most significant node of said 7 bit data output, said third EXCLUSIVE OR gate having a first input coupled to said least significant node of said first 3 bit data input and an output coupled to a fourth most significant node of said 7 bit data output, said fourth EXCLUSIVE OR gate having a second input coupled to said most significant node of said second 3 bit data input and an output coupled to a fifth most significant node of said 7 bit data output, and said fifth EXCLUSIVE OR gate having first and second inputs coupled to said least significant node of said second 3 bit data input and said output of said third INVERTER, respectively, and an output coupled to a sixth most significant node of said 7 bit data output.

11. An apparatus to determine a number of leading count digits in a data input signal as in claim 8, the apparatus further comprising:

a fourth input to receive a fourth data input signal, the fourth data input signal having a first state when a non-count digit is present in the R most significant digits and a second state when a non-count digit is absent in the R most significant digits; and a fifth input to receive a fifth data input signal, the fifth data input signal having a first state when a non-count digit is present in the X groups of M digits and a second state when a non-count digit is absent in the X groups of M digits;

wherein the multiplexer circuitry is further coupled to the fourth input and the fifth input to provide a data output signal representing the number of leading count digits in the R most significant digits when the multiplexer circuitry receives the fourth data input signal having the first state, to provide a data output signal representing the absence of a non-count digit in the data input signal when the multiplexer circuitry receives the fourth data input signal and the fifth data input signal both having the second state, and to provide a data output signal representing the concatenation plus R signal when the multiplexer circuitry receives the fourth data input signal having a second state and the fifth data input signal having a first state.

12. An apparatus to determine a number of leading count digits in a data input signal, the data input signal having X groups of M digits, each digit having one of N possible values comprised of count values and non-count values, wherein a count digit is a digit having a count value, the apparatus comprising:

a first counter having an input to receive a most significant group of the X groups of M digits having a non-count digit, having counter circuitry to determine a first count number, the first count number representing a location of the most significant non-count digit in the X groups of M digits, and having an output to communicate the first count number;

a plurality of detectors, each having an input to receive a group of the M digits, each having detector circuitry to detect the presence and absence of a non-count digit in the respective group of M digits, and each having an output to communicate a first state when a non-count digit is present and to communicate a second state when a non-count digit is absent in the M digits;

a second counter having an input coupled to the outputs of the detectors, having counter circuitry responsive to the first states and second states communicated from the detectors to determine a second count number, the second count number representing the number of leading groups of the X groups of M digits having an absence of a non-count digit, and having an output to communicate the second count number; and a concatenator having an input coupled to the outputs of the first counter and the second counter to receive the first count number and the second count number, respectively, and having concatenator circuitry to concatenate the second count number to the first count number to form a concatenation signal representing the number of leading count digits in the X groups of M digits in the data input signal; wherein the first count number is represented by Z digits where $M=N^Z$ and X, M, N, and Z are non-negative integers.

13. An apparatus to determine a number of leading count digits in a data input signal as in claim 12, wherein the data input signal further comprises R most significant digits, each digit having one of N possible values comprised of count values and non-count values, the apparatus further comprising:

a counter-detector having an input to receive the R most significant digits, having counter circuitry to determine a third count number, the third count number representing a location of the most significant non-count digit in the R most significant digits, having detector circuitry to detect the presence and absence of a non-count digit in the R most significant digits, having a first output to communicate the third count number, and having a second output to communicate a first state when a non-count digit is present and to communicate a second state when a non-count digit is absent in the R most significant digits;

adder circuitry, coupled to the concatenator circuitry, to add R to the concatenation signal to form a concatenation plus R signal, wherein the adder circuitry includes an output to communicate the concatenation plus R signal; and multiplexer circuitry, coupled to the adder output to receive the concatenation plus R signal and to the counter-detector circuitry to receive the first and second outputs, wherein the multiplexer circuitry provides a data output signal to an output representing the concatenation plus R signal when the second output communicates a second state and representing the third count number when the second output communicates a first state.

14. An apparatus as in claim 13, wherein X equals 8, M equals 8, and Z equals 3, N equals 2, and R equals 3.

15. An apparatus as in claim 13, wherein the third counter-detector is comprised of:

a 3 bit data input having three nodes;

a 2 bit data output having two nodes;

a 1 bit data output having one node;

a counter circuit having a first INVERTER, a first NOR gate, and a second NOR gate, wherein said first INVERTER having an input coupled to a second most significant node of said 3 bit data input and an output, said first NOR gate having a first input coupled to a most significant node of said 3 bit data input, a second input coupled to said second most significant node of said 3 bit data input, and an output coupled to a most significant node of said 2 bit data output, and said second NOR gate having a first input coupled to said output of said first INVERTER, a second input coupled to said most significant node of said 3 bit data input, and an output coupled to a least significant node of said 2 bit data output; and a detector circuit having a third NOR gate and a second INVERTER, wherein said third NOR gate having first, second, and third inputs coupled to a most significant node, a second most significant node, and a least significant node of said 3 bit data input, respectively, and an output coupled to an input of said second INVERTER, said second INVERTER having an output coupled to said node of said 1 bit data output.

16. An apparatus to determine a number of leading count digits in a data input signal, the data input signal having X groups of M digits, each digit having one of N possible values comprised of count values and non-count values, the apparatus comprising:

a plurality of first counter-detectors, each having an input to receive a group of the X groups of M digits, each having first counter circuitry to determine a location of a most significant non-count digit in the respective group, each having detector circuitry to detect the presence and absence of a non-count digit in the group, each having a first count output to communicate a first count output signal representing the location of the most significant non-count digit when a non-count digit is present, and each having a first detector output to communicate a first detector output signal having a first state representing the presence of a non-count digit, wherein a non-count digit is a digit having a non-count value;

a second counter-detector coupled to the first detector outputs and having an input to receive the first detector signals, wherein the second counter-detector includes second counter circuitry to determine a counter-detector associated with a most significant first detector output signal having a first state, second detector circuitry to detect the presence and absence of at least one first detector output signal having a first state, a second count output to communicate a second count output signal representing a location of the counter-detector associated with the most significant first detector output signal having a first state, and a second detector output to communicate a second detector output signal having a first state when a first state is detected in at least one of the first detector output signals and a second state when an absence of a first state is detected in the first detector output signals, wherein the second count output signal represents the number of most significant groups of the X groups of M bits having an absence of non-count digits;

a decoder having an input coupled to the first counter-detector outputs to receive the first count output signal and the first detector output signal, wherein the decoder includes decoder circuitry, responsive to the most significant first detector signal having a first state, to communicate to a decoder output a decoder output signal representing the most significant first count output signal having a non-count digit;

a concatenator having an input coupled to the second counter output and the decoder output to receive the second count output signal and the decoder output signal, respectively, wherein the concatenator includes concatenator circuitry to concatenate the second count output signal to the decoder signal to form a concatenation signal and to communicate the concatenation signal to a concatenator output, wherein the decoder output signal is represented by Z digits where $M=N^Z$ and X, M, N, and Z are non-negative integers; and a multiplexer having an input coupled to the second detector output and to the concatenator output to receive the second detector output signal and the concatenator signal, respectively, wherein the multiplexer includes multiplexer circuitry, responsive to the state of the second detector output signal, to communicate the concatenation signal to a multiplexer output when the second detector output signal has a first state and to communicate a signal to the multiplexer output representing the number of digits in the data input signal when the second detector output signal has a second state.

17. An apparatus as in claim 16, wherein X equals 8, M equals 8, and Z equals 3, and N equals 2.

18. An apparatus as in claim 16, wherein the counter-detector is comprised of:

an 8 bit data input having eight nodes;

a 3 bit data output having 3 nodes;

a 1 bit data output having a node;

a first circuit having first and second NOR gates, first through fourth INVERTERS, a first OR gate, and first through ninth NAND gates, wherein said first NOR gate having first and second inputs coupled to a most significant node and a second most significant node of said 8 bit data input, respectively, and having an output, said second NOR gate having first and second inputs coupled to fifth and sixth most significant nodes of said 8 bit data input, respectively, and having an output, wherein said first INVERTER having an input coupled to said most significant node of said 8 bit data input and having an output, said second INVERTER having an input coupled to a third most significant node of said 8 bit data input and having an output, said third INVERTER having an input coupled to said fifth most significant node of said 8 bit data input and having an output, said fourth INVERTER having an input coupled to a seventh most significant node of said 8 bit data input and having an output, wherein said OR gate having first and second inputs coupled to third and fourth most significant nodes of said 8 bit data input, respectively, and having an output, wherein said first NAND gate having a first input coupled to said output of said first INVERTER, a second input coupled to said second most significant node of said 8 bit data input, and having an output, said second NAND gate having a first input coupled to said fourth most significant node of said 8 bit data input, a second input coupled to said output of said second INVERTER, a third input coupled to said output of said first NOR gate, and an output, said third NAND gate having a first input coupled to said sixth most significant node of said 8 bit data input, a second input coupled to said output of said third INVERTER, a third input, and an output, said fourth NAND gate having a first input coupled to said output of said fourth INVERTER, a second input coupled to said output of said second NOR gate, a third input, and an output, said fifth NAND gate having a first input coupled to said output of said OR gate, a second input coupled to said output of said first NOR gate, and an output, said sixth NAND gate having a first input coupled to said output of said second NOR gate, a second input, and an output, said seventh NAND gate having first, second, third, and fourth inputs coupled to said outputs of said first, second, third, and fourth outputs of said NAND gates, respectively, and having an output coupled to a least significant node of said 3 bit data output, and said eighth NAND gate having first and second inputs coupled to said outputs of said fifth and sixth NAND gates, respectively, and an output coupled to a second most significant node of said 3 bit data output; and a second circuit having third and fourth NOR gates and a ninth NAND gate, wherein said third NOR gate having first, second, third, and fourth inputs coupled to said most significant, second most significant, third most significant, and fourth most significant nodes of said 8 bit data input signal, respectively, and having an output coupled to said third input of said third NAND gate, to said third input of said fourth NAND gate, to said second input of said sixth NAND gate, and to a most significant node of said 3 bit data output, said fourth NOR gate having first, second, and third inputs coupled to said fifth, sixth, and seventh most significant nodes of said 8 bit data input, respectively, having a fourth input coupled to a least significant node of said 8 bit data input, and having an output, said ninth NAND gate having a first input coupled to said output of said fourth NOR gate, a second input coupled to said output of said third NOR gate, and an output coupled to said node of said 1 bit data output.

19. An apparatus as in claim 16, wherein the decoder is comprised of:

first through eighth 1 bit data inputs each having one node;

first through eighth 3 bit data inputs each having three nodes;

a 3 bit data output having three nodes;

a first circuit having a first INVERTER, first through sixth NOR gates, and first through seventh NAND gates, wherein said first INVERTER having an input coupled to said node of said first 1 bit data input and an output, wherein said first NOR gate having a first input coupled to said node of said second 1 bit data input, a second input coupled to said node of said first 1 bit data input, and an output, said second NOR gate having a first input coupled to said node of said third 1 bit data input, a second input coupled to said first input of said first NOR gate, a third input coupled to said second input of said first NOR gate, and an output, said third NOR gate having a first input coupled to said node of said fourth 1 bit data input, a second input coupled to said first input of said second NOR gate, a third input coupled to said first input of said first NOR gate, a fourth input coupled to said second input of said first NOR gate, and an output, said fourth NOR gate having a first input coupled to said first input of said third NOR gate, a second input coupled to said node of said fifth 1 bit data input, and an output, said fifth NOR gate having a first input coupled to said node of said sixth 1 bit data input, a second input coupled to said second input of said fourth NOR gate, and an output, said sixth NOR gate having a first input coupled to said node of said seventh 1 bit data input, a second input coupled to said first input of said fifth NOR gate, a third input coupled to said second input of said fourth NOR gate, and an output, said first NAND gate having a first input coupled to said output of said first INVERTER, a second input coupled to said first input of said first NOR gate, and an output, said second NAND gate having a first input coupled to said output of said first NOR gate and a second input coupled to said first input of said second NOR gate, and an output, said third NAND gate having a first input coupled to said output of said second NOR gate, a second input coupled to said first input of said third NOR gate, and an output, a fourth NAND gate having a first input coupled to said output of said third NOR gate, a second input coupled to said second input of said fourth NOR gate, and an output, a fifth NAND gate having a first input coupled to said output of said second NOR gate, a second input coupled to said output of said fourth NOR gate, a third input coupled to said first input of said fifth NOR gate, and an output, a sixth NAND gate having a first input coupled to said output of said third NOR gate, a second input coupled to said output of said fifth NOR gate, a third input coupled to said first input of said sixth NOR gate, and an output, and a seventh NAND gate having a first input coupled to said output of said third NOR gate, a second input coupled to said output of said sixth NOR gate, a third input coupled to said node of said eighth 1 bit data input, and an output;

a second circuit having second through ninth INVERTERS, seventh through sixteenth NOR gates, and an eighth NAND gate, wherein said second through ninth INVERTERS each having an input coupled to a most significant node of said first through eighth 3 bit data inputs, respectively, and each having an output coupled to a second input of said seventh through fourteenth NOR gates, respectively, said seventh through fourteenth NOR gates each having a first input coupled to said outputs of said first INVERTER and said first through seventh NAND gates, respectively, and each having an output, said fifteenth NOR gate having a first input coupled to said output of said seventh NOR gate, a second input coupled to said output of said eighth NOR gate, a third input coupled to said output of said ninth NOR gate, a fourth input coupled to said output of said tenth NOR gate, and having an output, said sixteenth NOR gate having a first input coupled to said output of said eleventh NOR gate, a second input coupled to said output of said twelfth NOR gate, a third input coupled to said output of said thirteenth NOR gate, a fourth input coupled to said output of said fourteenth NOR gate, and having an output, and said eighth NAND gate having first and second inputs coupled to said outputs of said fifteenth and sixteenth NOR gates, respectively, and having an output coupled to a most significant node of said 3 bit data output;

a third circuit having tenth through seventeenth INVERTERS, seventeenth through twenty sixth NOR gates, and a ninth NAND gate, wherein said tenth through seventeenth INVERTERS each having an input coupled to a most significant node of said first through eighth 3 bit data inputs, respectively, and each having an output coupled to a second input of said seventeenth through twenty fourth NOR gates, respectively, said seventeenth through twenty fourth NOR gates each having a first input coupled to said outputs of said first INVERTER and said first through seventh NAND gates, respectively, and each having an output, said twenty fifth NOR gate having a first input coupled to said output of said seventeenth NOR gate, a second input coupled to said output of said eighteenth NOR gate, a third input coupled to said output of said nineteenth NOR gate, a fourth input coupled to said output of said twentieth NOR gate, and having an output, said twenty sixth NOR gate having a first input coupled to said output of said twenty first NOR gate, a second input coupled to said output of said twenty second NOR gate, a third input coupled to said output of said twenty third NOR gate, a fourth input coupled to said output of said twenty fourth NOR gate, and having an output, and said ninth NAND gate having first and second inputs coupled to said outputs of said twenty fifth and twenty sixth NOR gates, respectively, and having an output coupled to a second most significant node of said 3 bit data output; and a fourth circuit having eighteenth through twenty fifth INVERTERS, seventeenth through thirty sixth NOR gates, and a tenth NAND gate, wherein said eighteenth through twenty fifth INVERTERS each having an input coupled to a most significant node of said first through eighth 3 bit data inputs, respectively, and each having an output coupled to a second input of said seventeenth through thirty fourth NOR gates, respectively, said seventeenth through thirty fourth NOR gates each having a first input coupled to said outputs of said first INVERTER and said first through seventh NAND gates, respectively, and each having an output, said thirty fifth NOR gate having a first input coupled to said output of said seventeenth NOR gate, a second input coupled to said output of said twenty eighth NOR gate, a third input coupled to said output of said twenty ninth NOR gate, a fourth input coupled to said output of said thirtieth NOR gate, and having an output, said thirty sixth NOR gate having a first input coupled to said output of said thirty first NOR gate, a second input coupled to said output of said thirty second NOR gate, a third input coupled to said output of said thirty third NOR gate, a fourth input coupled to said output of said thirty fourth NOR gate, and having an output, and said tenth NAND gate having first and second inputs coupled to said outputs of said thirty fifth and thirty sixth NOR gates, respectively, and having an output coupled to a least significant node of said 3 bit data output.

20. A method for determining a number of leading count digits in a data input signal, the data input signal having X groups of M digits, each digit having one of N possible values comprised of count values and non-count values, the method comprising the steps of:

receiving the data input signal having X groups of M digits;

determining a first number, the first number being a number of leading count digits in a most significant non-count group, the most significant non-count group being a most significant group of the X groups of M digits having a non-count digit, wherein a count digit is a digit having a count value and a non-count digit is a digit having a non-count value;

determining a second number, the second number being a number of most significant groups of the X groups of M digits preceding the first non-count group; and concatenating the second number to the first number to form a concatenation signal, wherein the concatenation signal indicates the number of leading count digits in the X groups of M digits in the data input signal, wherein the first number is represented by Z digits and $M=N^Z$ and X, M, N, and Z are non-negative integers.

21. A method as in claim 20 further comprising the steps of:

following the receiving step, detecting a presence and absence of a non-count digit in the data input signal;

following the concatenating step, providing a data output signal representing the concatenation signal when the presence of a non-count digit is detected; and providing a data output signal representing the absence of a non-count digit when the absence of a non-count digit is detected.

22. A method as in claim 20, wherein the data input signal is received in parallel.

23. A method as in claim 20, wherein X equals 8, N equals 2, M equals 8, and Z equals 3.

24. A method as in claim 20, wherein the data input signal further comprises R most significant digits, each digit having one of N possible values comprised of count values and non-count values, the method further comprising the steps of:

receiving the R most significant digits;

determining a third number, the third number being a number of leading count digits in the R most significant digits, wherein the third number indicates the number of leading count digits in the data input signal when the R most significant digits include a non-count digit; and adding R to the concatenation signal to form a concatenation plus R signal, wherein the concatenation plus R signal indicates the number of leading count values in the data input signal when the R most significant digits exclude non-count values.

25. A method as in claim 24 further comprising the steps of:

following the second receiving step, detecting the presence and absence of a non-count value in the R most significant digits;

following the initial determining step, detecting the presence and absence of a non-count digit in the X groups of M digits;

providing a data output signal representing the concatenation plus R signal when the absence of a non-count digit is detected in the R most significant digits and the presence of a non-count digit is detected in the X groups of M digits;

providing a data output signal representing the number of leading count digits in the R most significant digits when the presence of a non-count digit is detected in the R most significant digits; and providing a data output signal representing the absence of a non-count digit when the absence of a non-count digit is detected in the R most significant digits and in the X groups of M digits.

26. A method as in claim 25, wherein X equals 8, M equals 8, and Z equals 3, N equals 2, and R equals 3.

27. An apparatus to determine a number of leading count digits in a data input signal, the data input signal having X groups of M digits, each digit having one of N possible values comprised of count values and non-count values, the apparatus comprising the steps of:

means for receiving the data input signal having X groups of M digits, the means for receiving having a means for conducting the digits;

means for determining a first number, coupled to means for conducting the digits of the means for receiving and having an output, the first number being a number of leading count digits in a most significant non-count group, the most significant non-count group being a most significant group of the X groups of M digits having a non-count digit, wherein a count digit is a digit having a count value and a non-count digit is a digit having a non-count value;

means for determining a second number, coupled to the means for conducting of the means for receiving and having an output, the second number being a number of most significant groups of the X groups of M digits preceding the first non-count group; and means for concatenating the second number to the first number to form a concatenation signal, coupled to the outputs of the means for determining a first number and the means for determining a second number and having an output, wherein the concatenation signal indicates the number of leading count digits in the X groups of M digits in the data input signal, wherein the first number is represented by Z digits and $M=N^Z$, and X, M, N, and Z are non-negative integers.

28. An apparatus as in claim 27, wherein the data input signal is received in parallel.

29. An apparatus as in claim 27, wherein X equals 8, N equals 2, M equals 8, and Z equals 3.

30. An apparatus as in claim 27, wherein the data input signal further comprises R most significant digits, each digit having one of N possible values comprised of count values and non-count values, the method further comprising the steps of:

means for receiving the R most significant digits, having a means for conducting the R most significant digits;

means for determining a third number, coupled to the means for conducting the R most significant bits and having an output, the third number being a number of leading count digits in the R most significant digits, wherein the third number indicates the number of leading count digits in the data input signal when the R most significant digits include a non-count digit; and means for adding R to the concatenation signal to form a concatenation plus R signal, coupled to said means for concatenating, wherein the concatenation plus R signal indicates the number of leading count values in the data input signal when the R most significant digits exclude non-count values.

31. A computer system comprising:

an external memory that stores floating point data;

a microprocessor having an interface coupled to the external memory, wherein the microprocessor includes a floating point unit, the floating point unit includes a renormalizing unit that operates on a data input signal obtained from floating point data from the memory, the renormalizing unit includes a leading bit indicator to determine a number of leading count digits in the data input signal, the data input signal having X groups of M digits, each digit having one of N possible values comprised of count values and non-count values, the leading digit indicator comprising:

a counter circuit having an input to receive the data input signal, having a first output to provide a first data signal, the first data signal being indicative of a number of most significant groups of the X groups of M digits leading a most significant non-count group, wherein the most significant non-count group is a most significant group of the X groups of M digits having a non-count digit, wherein a non-count digit is a digit having a non-count value, and having a second output to provide a second data signal, the second data signal being indicative of a number of leading count digits in the most significant non-count group, wherein a count digit is a digit having a count value;

concatenator circuitry, having a first input coupled to the counter circuit first output to receive the first data signal and a second input coupled to the counter circuit second output to receive the second data signal, to concatenate the first data input signal and the second data input signal to form a concatenation signal representing the number of leading count digits in the X groups of M digits in the data input signal; and wherein the second data signal is represented by Z digits where $M=N^Z$ and X, M, N, and Z are non-negative integers.

32. A computer system as in claim 31, wherein X equals 8, M equals 8, and Z equals 3, and N equals 2.

33. A computer system as in claim 31, wherein the data input signal further comprises R most significant digits, each digit having one of N possible values comprised of count values and non-count values, the computer system further comprising:

a counter-detector having an input to receive the R most significant digits and having an output to provide a third data signal, the third data signal being indicative of a number of leading count digits in the R most significant digits and the presence and absence of a non-count digit in the R most significant digits;

adder circuitry, coupled to the concatenator circuitry to receive the concatenation signal, to add R to the concatenation signal to form a concatenation plus R signal, wherein the adder circuitry includes an output to communicate the concatenation plus R signal; and multiplexer circuitry, coupled to the adder output to receive the concatenation plus R signal and to the counter-detector output to receive the third data signal, wherein the multiplexer includes an output to provide a data output signal representing the concatenation plus R signal when the third data signal indicates the absence of a non-count digit in the R most significant digits and to provide a data output signal representing the number of leading count digits in the R most significant digits when the third data signal indicates the presence of a non-count digit in the R most significant digits.

34. An apparatus as in claim 33, wherein X equals 8, M equals 8, and Z equals 3, N equals 2, and R equals 3.

35. An apparatus to determine a number of leading count digits in a data input signal, comprising:

a plurality of non-count digit detectors, each having an input coupled to a group of digits of the data input signal, a first output to indicate when asserted that a non-count digit is present in the input thereof, and a second output to indicate a number of count digits leading a most significant non-count digit, if any, in the input thereof;

a most significant asserted signal detector having inputs coupled to the first outputs of the non-count digit detectors, and having an output to indicate a number of the non-count digit detectors leading a most significant one of the non-count digit detectors having the first output thereof asserted; and a selector having inputs coupled to the first and second outputs of the non-count digit detectors, and an output to furnish the second output of the most significant one of the non-count digit detectors having the first output thereof asserted.

* * * * *

UNITED STATES PATENT AND TRADEMARK OFFICE
CERTIFICATE OF CORRECTION

PATENT NO. : 5,574,670
DATED : November 12, 1996
INVENTOR(S) : Leo Lozano

It is certified that error appears in the above-indentified patent and that said Letters Patent is hereby corrected as shown below:

```
Column 10, line 41
      delete "64bit" and insert --64 bit--
```

Signed and Sealed this

First Day of April, 1997

Attest:

BRUCE LEHMAN

*Attesting Officer*   *Commissioner of Patents and Trademarks*